United States Patent
Boulanger

(10) Patent No.: US 11,609,301 B2
(45) Date of Patent: Mar. 21, 2023

(54) RADAR DATA PROCESSING SYSTEMS AND METHODS

(71) Applicant: Teledyne FLIR Commercial Systems, Inc., Ridgefield Park, NJ (US)

(72) Inventor: Pierre M. Boulanger, Goleta, CA (US)

(73) Assignee: Teledyne FLIR Commercial Systems, Inc., Goleta, CA (US)

(*) Notice: Subject to any disclaimer, the term of this patent is extended or adjusted under 35 U.S.C. 154(b) by 419 days.

(21) Appl. No.: 16/808,307

(22) Filed: Mar. 3, 2020

(65) Prior Publication Data

US 2020/0292662 A1  Sep. 17, 2020

Related U.S. Application Data

(60) Provisional application No. 62/819,328, filed on Mar. 15, 2019.

(51) Int. Cl.
*G01S 7/06* (2006.01)
*G01S 7/35* (2006.01)
*G06T 1/20* (2006.01)
*G01S 13/89* (2006.01)

(52) U.S. Cl.
CPC ............... *G01S 7/06* (2013.01); *G01S 7/352* (2013.01); *G01S 13/89* (2013.01); *G06T 1/20* (2013.01); *G01S 7/356* (2021.05)

(58) Field of Classification Search
None
See application file for complete search history.

(56) References Cited

U.S. PATENT DOCUMENTS

| | | |
|---|---|---|
| 5,416,711 A | 5/1995 | Gran |
| 8,624,776 B2 | 1/2014 | Jales et al. |
| 9,024,816 B2 | 5/2015 | Jales et al. |
| 9,372,257 B2 | 6/2016 | Jales et al. |
| 9,618,605 B2 | 4/2017 | Jales et al. |
| D790,514 S | 6/2017 | Woodward et al. |
| 10,024,953 B2 | 7/2018 | Johnson et al. |
| 10,070,074 B2 | 9/2018 | Boulanger et al. |
| 2002/0166004 A1 | 11/2002 | Kim |
| 2006/0266942 A1 | 11/2006 | Ikeda |

(Continued)

FOREIGN PATENT DOCUMENTS

CN 104459662 3/2015

OTHER PUBLICATIONS

Bialer et al., "Multi-Doppler Resolution Automotive Radar", 25th European Signal Processing Conference (EUSIPCO), pp. 1937-1941, 2017.
Ro et al., "Threat mediation via a real-time stereoscopic catadioptric omnivision system", article, May 2, 2006, 10 pages, vol. 6231—Unattended Ground Sea and Air Sensor Technologies and Applications VII, SPIE, URL: http://spie.org/Publications/Proceedings/Paper/10.1117/12.668500.

(Continued)

*Primary Examiner* — Whitney Moore
(74) *Attorney, Agent, or Firm* — Haynes and Boone, LLP

(57) ABSTRACT

Techniques to facilitate radar data processing are disclosed. In one example, a radar system includes a frame generation circuit and a frame processing circuit. The frame generation circuit is configured to receive radar signals. The frame generation circuit is further configured to convert the radar signals to at least one frame having a camera interface format. The frame processing circuit is configured to receive the at least one frame via a camera interface. The frame processing circuit is further configured to process the at least one frame. Related methods and devices are also provided.

20 Claims, 17 Drawing Sheets

(56) References Cited

U.S. PATENT DOCUMENTS

| | | |
|---|---|---|
| 2010/0302376 A1 | 12/2010 | Boulanger et al. |
| 2016/0156855 A1* | 6/2016 | Boulanger ............... H04N 5/76 |
| | | 348/164 |
| 2018/0074173 A1* | 3/2018 | Trotta .................. H01Q 9/0407 |
| 2018/0143314 A1 | 5/2018 | Lamontagne et al. |
| 2018/0292529 A1 | 10/2018 | Hogasten |
| 2019/0324449 A1* | 10/2019 | Wang ...................... G01C 11/02 |
| 2020/0018848 A1 | 1/2020 | Rivers et al. |
| 2020/0233059 A1* | 7/2020 | Brett ....................... G01S 13/28 |

OTHER PUBLICATIONS

Meijer et al., "Multiple View Camera Calibration for Localization", article, Sep. 1, 2007, 7 pages, First ACM/IEEE Conference on Distributed Smart Cameras, ICDSC, Vienna, Austria, URL: https://www.seeingwithsound.com/thesis/icdsc07_meijer_etal.pdf.

Nurpinar Akdeniz, "Digital Signal Processor (DSP) Accelerated Image Enhancement for Infrared Imaging Systems", Master's Thesis, Jul. 1, 2011, 63 pages, Atilim University, Ankara, Turkey, URL: http://acikarsiv.atilim.edu.tr/browse/402/410968.pdf.

Anonymous, "Cell (microprocessor)", web page, Jul. 23, 2013, 16 pages, Wikipedia, internet, URL: https://en.wikipedia.org/wiki/Cell_(microprocessor).

Anonymous, "Intel i860", 7 pages, [online], [retrieved on Nov. 17, 2016). Retrieved from the Internet: <URL: httos://en. wikioedia. ora/w/index.oho?title=lnteli860&oldid=565851456>.

* cited by examiner

RADAR DATA PROCESSING SYSTEMS AND METHODS

TECHNICAL FIELD

This application claims the benefit of and priority to U.S. Provisional Patent Application No. 62/819,328 filed Mar. 15, 2019 and entitled "RADAR DATA PROCESSING SYSTEMS AND METHODS," which is incorporated herein by reference in its entirety.

TECHNICAL FIELD

One or more embodiments relate generally to radar systems and more particularly, for example, to radar data processing systems and methods.

BACKGROUND

Radar systems are commonly used to detect targets (e.g., objects, geographic features, or other types of targets), such as targets in proximity to watercraft, aircraft, vehicles, or fixed locations. The radar systems may transmit (e.g., broadcast) radar signals and receive return signals. Such return signals may be based on reflections of the transmitted radar signals by targets.

SUMMARY

Various techniques are disclosed for providing a radar system utilized to transmit radar signals, receive return signals, and process the return signals for various radar applications. For example, in certain embodiments, such a radar system may be implemented in a cost-efficient manner and with a high degree of functionality. In some embodiments, radar data (e.g., return radar signals) are converted into frames having a format appropriate for being provided to camera interfaces. Such frames may be referred to as camera interface frames and have a camera format that can be provided to image processing pipelines, such as those provided by a vision processing unit. As such, in some aspects, the radar data is adapted to appear like the data came from a camera. In some embodiments, conversion of the digital radar data into camera frames allows leveraging high processing power and flexibility and low costs of multi-vector processors (e.g., multi-core vector processors), such as vision processor units by way of non-limiting example, to process the radar data as if they were camera image data. More generally, a camera format may be a format compatible with a desired processor architecture, and, without such conversion of the radar data, the radar data does not have a format appropriate for processing by the desired processor architecture. Using various embodiments, an entire signal chain formed of the radar signal processing blocks may be implemented using a single device (e.g., a single multi-core vector processor). In some cases, a low-cost system-on-chip single device central processing unit and software architecture can be used to implement radar applications at low cost.

In one or more embodiments, a radar system includes a frame generation circuit and a frame processing circuit. The frame generation circuit is configured to receive radar signals. The frame generation circuit is further configured to convert the radar signals to at least one frame having a camera interface format. The frame processing circuit is configured to receive the at least one frame via a camera interface. The frame processing circuit is further configured to process the at least one frame.

In one or more embodiments, a method for facilitating radar data processing is provided. The method includes receiving radar signals. The method further includes converting the radar signals to at least one frame having a camera interface format. The method further includes transmitting the at least one frame on a camera interface. The method further includes processing the at least one frame received via the camera interface.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
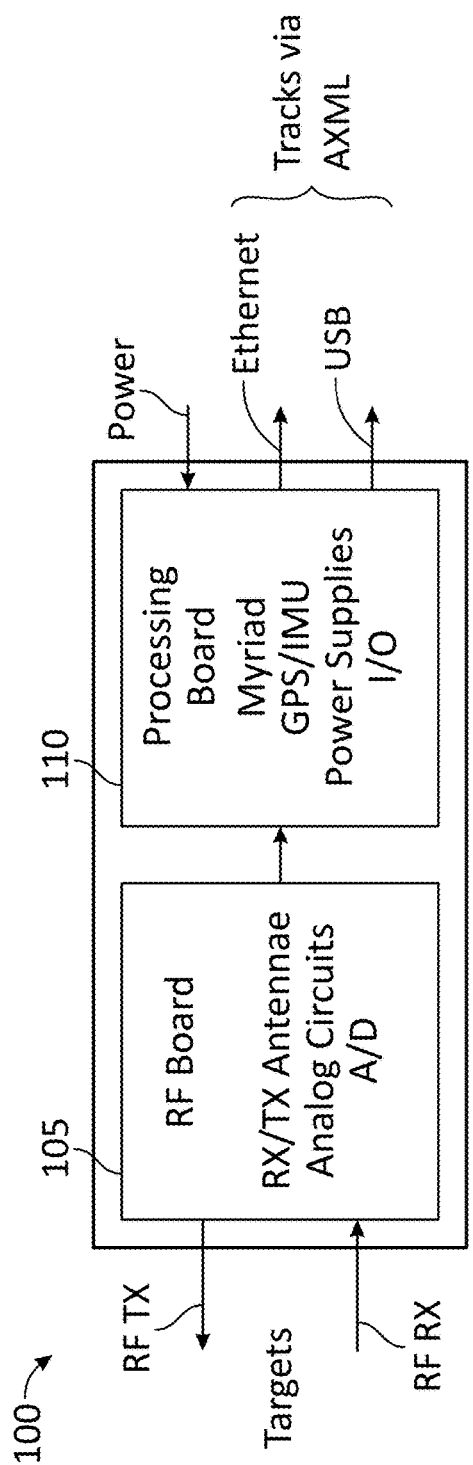
FIG. 1 illustrates a block diagram of an example radar system in accordance with one or more embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided for facilitating radar data processing. In some embodiments, radar data (e.g., return radar signals) are converted into frames having a format appropriate for being provided to camera interfaces (CIF) (e.g., also referred to as CIF interfaces). Such frames may be referred to as CIF frames and have a camera format that can be provided to image processing pipelines, such as those provided by a vision processing unit (VPU). For example, a VPU may have direct interfaces for receiving data from cameras (e.g., frames having a camera format). As such, in some aspects, the radar data is adapted to appear like the data came from a camera. In various embodiments, a radar signal is converted to a digital radar signal with an analog-to-digital converter, and this digital radar signal is then converted to one or more CIF frames. In this regard, the digital radar signal output by the analog-to-digital converter is adapted to be compatible with a video input port of a VPU or other desired processor. In an embodiment, the radar data may be based on frequency-modulated continuous wave (FMCW) waveforms.

In some embodiments, conversion of the digital radar data into camera frames allows leveraging high processing power and flexibility and low costs of multi-vector processors (e.g., multi-core vector processors), such as VPUs by way of non-limiting example, to process the digital radar data as if they were camera image data. In this regard, the camera format may be a format compatible with a desired processor architecture. Without such conversion of the radar data, the radar data does not have a format appropriate for processing by the desired processor architecture. Using various embodiments, an entire signal chain formed of the radar signal processing blocks may be implemented using a single device (e.g., a single multi-core vector processor). In some cases, a low-cost system-on-chip single device central processing unit (CPU) and software architecture can be used to implement radar applications at low cost.

In one embodiment, each CIF frame may be processed using a VPU or other desired processor. Each processing instruction may cause multiple pixels associated with a CIF frame to be processed. In an aspect, each CIF frame may include multiple lines of data. Each line may include data associated with at least one receiver antenna element. As an example, consider a case that a CIF frame has at least twelve lines of data and data is processed four lines at a time. In an iteration, lines 0-3 of a CIF frame may be performed by a first block (e.g., windowing) to obtain data associated with processing the lines 0-3 (referred to as processed lines 0-3). In a next iteration, lines 4-7 of the CIF frame may be performed by the first block to obtain data associated with processing the lines 4-7 (referred to as processed lines 4-7) simultaneously with (e.g., substantially simultaneously with) the processed lines 0-3 being processed by a second block (e.g., Fast Fourier Transform) to obtain data associated with processing the processed lines 0-3 (referred to as further processed lines 0-3). In a still next iteration, lines 8-11 of the CIF frame may be performed by the first block to obtain data associated with processing lines 8-11 simultaneously with (e.g., substantially simultaneously with) the processed lines 4-7 being further processed by the second block and the further processed lines 0-3 being further processed by a third block (e.g., beamforming). Subsequent iterations may be performed in a similar manner. Such multi-vector processing provides a pipeline that allows processing of multiple pixels in parallel and staggered processing of these pixels, where an output of a processing block is provided as input to a next processing block. Operations performed in each block is performed within a certain time frame to allow parallel processing within each block and serial processing wherein outputs from one block are provided to a next block for processing. In some cases, memory may be appropriately allocated for each block and each group of pixels (e.g., processed pixels and/or pixels to be processed) to facilitate efficient parallel and serial processing. While the foregoing provides an example in which a CIF frame has at least twelve lines and four lines of a CIF frame are processed at a time, a CIF frame may have fewer than twelve lines, and/or more or fewer than four lines of a CIF frame may be processed at a time.

Appropriate line synchronization signals (e.g., vertical synchronization, horizontal synchronization) and clock signals (e.g., pixel clock) may be utilized to facilitate such operations. A vertical synchronization (VSYNC) signal may be asserted (e.g., at a logic high) for each new CIF frame. A horizontal synchronization (HSYNC) signal may be asserted for each line of digital radar data. A pixel clock (PCLK) signal may be asserted for each pixel (e.g., formed of a sample of n bits of the digital radar data). In some cases, internal data counters control assertion and deassertion of the VSYNC line and the HSYNC line according to number counts (e.g., number of lines per frame, number of pixels per line) associated with the CIF frame, lines, and pixels.

Techniques disclosed herein provide electronics architectures that allow efficient, scalable, flexible, yet cost-effective architectures for processing radar data that have been converted to CIF frames. In some embodiments, radar processing blocks may include one or more vector processors, where each vector processor is configured to operate on multiple pixels of the CIF frames in parallel to efficiently implement pixel-level parallelism. In this regard, according to various embodiments, a vector processor may perform single instruction multiple data (SIMD) operations that operate on multiple data elements (e.g., a vector of multiple pixels) in parallel, where each data element may be a pixel. Vector instructions for a vector processor may specify a same operation to be repeated independently for multiple data elements (e.g., multiple pixels). In other words, a vector instruction for a vector processor may specify an operation on an entire vector (e.g., a collection of multiple data elements) rather than on a single data element. Thus, operations performed by execution of vector instructions are often referred to as "vector operations," whereas operations on a single data element is referred to as "scalar operations." In some cases, a vector processor may include a plurality of vector registers to temporarily store multiple pixels to be operated on or produced by the vector processor. In some cases, each vector processor may be communicatively coupled to a local memory that provides high bandwidth, low latency access to a portion of the digital radar data contained in the CIF frames for the vector processor to operate on. A general-purpose processor may be utilized to manage data flow to/from the local memories and other system functionalities. Example architectures for performing vector processing on image data are provided in U.S. Pat. No. 10,070,074 entitled "VECTOR PROCESSING ARCHITECTURES FOR INFRARED CAMERA ELECTRONICS," which is incorporated herein by reference in its entirety. In some embodiments, processing of CIF frames containing digital radar data leverages vector processing systems and methods described in U.S. Pat. No. 10,070,074.

FIG. 1 illustrates a block diagram of a radar system 100 including a radio frequency (RF) board 105 and a processing board 110 in accordance with one or more embodiments of the present disclosure. In various embodiments, the radar system 100 may be configured for use on watercraft, aircraft, vehicles, fixed locations, or other environments, and may be used for various applications such as, for example, leisure navigation, commercial navigation, military navigation, other types of navigation, or other applications. In one embodiment, the radar system 100 may be implemented as a relatively compact portable unit that may be conveniently installed by a user.

The radar system 100 may be implemented with one or more amplifiers, modulators (e.g., downconverters, upconverters), phase adjusters, beamforming components, digital-to-analog converters (DACs), analog-to-digital converters (ADCs), various interfaces, transmit antennas, receive antennas, transducers, and/or other analog and/or digital components.

In some embodiments, the RF board 105 includes antenna elements (e.g., also referred to simply as antennas), ADCs, analog circuits, and/or other components appropriate for facilitating radar operation. On a transmit side, the RF board 105 may include transmit (TX) antenna elements and appropriate circuitry to generate radar signals and provide such radar signals to the TX antenna elements, such that these radar signals can be transmitted by the TX antenna elements. The circuitry may include a waveform generator that generates various waveforms to be utilized as radar signals. Such waveforms may include pulses of various lengths (e.g., different pulse widths), FMCW signals, and/or other waveforms appropriate for radar applications. FMCW signals are linear frequency varying signals also referred to as chirp signals. FMCW signals may be implemented, for example, as rising, falling, or rising/falling frequency sweeps (e.g., upchirps, downchirps, or up/down chirps). In some cases, the waveforms may be beamformed waveforms. In one aspect, the waveform generator may be implemented using components such as a voltage-controlled oscillator (VCO), a ramp generator, and/or a local oscillator (LO). The circuitry may include one or more power amplifiers that receive the radar signals from the waveform generator and drive the radar signals on the TX antenna elements. In some cases, characteristics of the radar signals may be based at least in part from control signals received by the RF board 105 from the processing board 110.

On a receive side, the RF board 105 may include receive (RX) antenna elements and circuitry to process radar signals received by the RX antenna elements. The RX antenna elements can receive radar signals that are reflections by targets/objects of the transmitted radar signals. These received radar signals may be referred to as return signals. The RF board 105 may include appropriate circuitry to process these return signals. The circuitry may include one or more low-noise amplifiers (LNAs) for amplifying the received radar signals. The circuitry may include a demodulator to receive the radar signals (e.g., from the LNA(s)) and convert the radar signals to baseband. In some cases, the demodulator may generate in-phase (I) signals and quadrature (Q) signals based on the received radar signals. The circuitry may include filters (e.g., low-pass filters) to be applied to the radar signals (e.g., baseband radar signals). The circuitry may include an ADC circuit to convert the radar signals (e.g., filtered radar signals) to convert filtered radar signals, which are analog signals, to digital radar signals. The digital radar signals are provided to the processing board 110 for further processing to facilitate radar applications (e.g., target detection applications).

The processing board 110 may include appropriate circuitry to receive the digital radar signals from the RF board 105 and process the digital radar signals. The circuitry may include processing circuitry to generate detection data based on the digital radar signals. In one case, the detection data may be utilized to generate images, alerts, and/or other information that can be provided to a user to enhance situational awareness. To generate the detection data, the processing circuitry may perform appropriate data organization and data format conversions, windowing and/or other filtering, and data transformations (e.g., Fourier Transforms). The processing board 110 may include other components. By way of non-limiting example, the processing board 110 may include a global positioning system (GPS), an inertial measurement unit (IMU), power supplies, and/or input/output (I/O) interfaces. The processing board 110 may include one or more interfaces for communicating with external devices, such as via an Ethernet interface(s) and/or a Universal Serial Bus (USB) interface. The processing board 110 may include one or more interfaces for receiving power or providing power. Other interfaces may include interfaces utilized primarily for development and manufacturing, such as Universal Asynchronous Receiver/Transmitter (UART) interface and a joint test action group (JTAG) interface (e.g., IEEE 1149.1 standard test access port and boundary-scan architecture).

In some embodiments, the processing board 110 may include circuitry to convert the digital radar data into frames having a format appropriate for being provided to CIF interfaces. Such frames may be referred to as CIF frames and have a camera format that can be provided to image processing pipelines, such as those provided by a VPU. For example, a VPU may have direct interfaces for receiving data from cameras (e.g., frames having a camera format). In some embodiments, conversion of the digital radar data into camera frames allows leveraging VPUs (e.g., low-cost VPUs) to process the digital radar data. In this regard, the camera format may be a format compatible with a desired VPU or other desired processor. Without such conversion, the digital radar data does not have a format appropriate for processing by a VPU or other desired processor.

Sensor signals, control signals, and other signals may be communicated among elements of the radar system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each component of the radar system 100 may include one or more modules supporting wired, wireless, and/or a combination of wired and wireless communication techniques.

Figure 2:
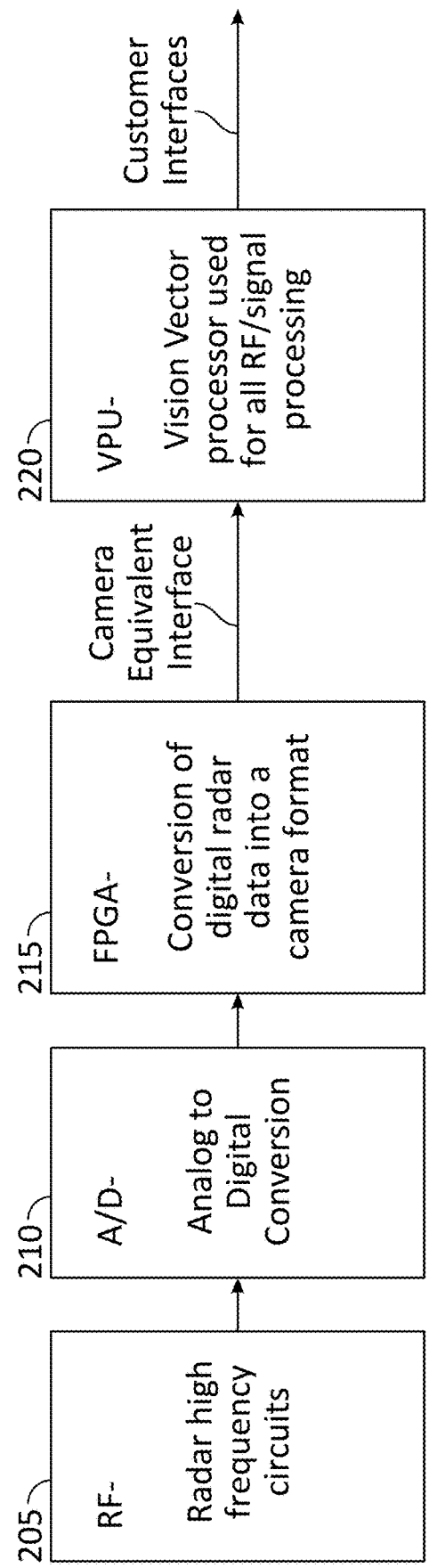
FIG. 2 illustrates a block diagram of an example radar system in accordance with one or more embodiments of the present disclosure.

FIG. 2 illustrates a block diagram of a radar system 200 in accordance with one or more embodiments of the present disclosure. The radar system 200 includes an RF circuit 205, an ADC circuit 210, a field-programmable gate array (FPGA) 215, and a VPU 220. The RF circuit 205 may include circuitry for accommodating high frequencies generally associated with radar applications. The RF circuit 205 may be utilized to transmit analog radar signals (e.g., FMCW waveforms) and receive analog return signals. The ADC circuit 210 may perform analog-to-digital conversion on the return signals to generate digital radar signals. In some cases, the received analog return signals may be processed (e.g., amplified by an LNA and/or demodulated to baseband) and then provided to the ADC circuit 210 for conversion to digital radar data. The FPGA 215 may receive the digital radar data from the ADC circuit 210 and convert the digital radar data into a camera format. The converted radar data may be provided onto a camera interface. The VPU 220 may obtain data from the camera interface, process the data, and provide results of such processing. The results may be provided via customer interfaces for storage, display, and/or further processing. In an embodiment, the RF circuit 205 and the ADC circuit 210 may implement the RF board 105 of FIG. 1, and/or the FPGA 215 and the VPU 220 may implement the processing board 110 of FIG. 1.

Figure 3A:
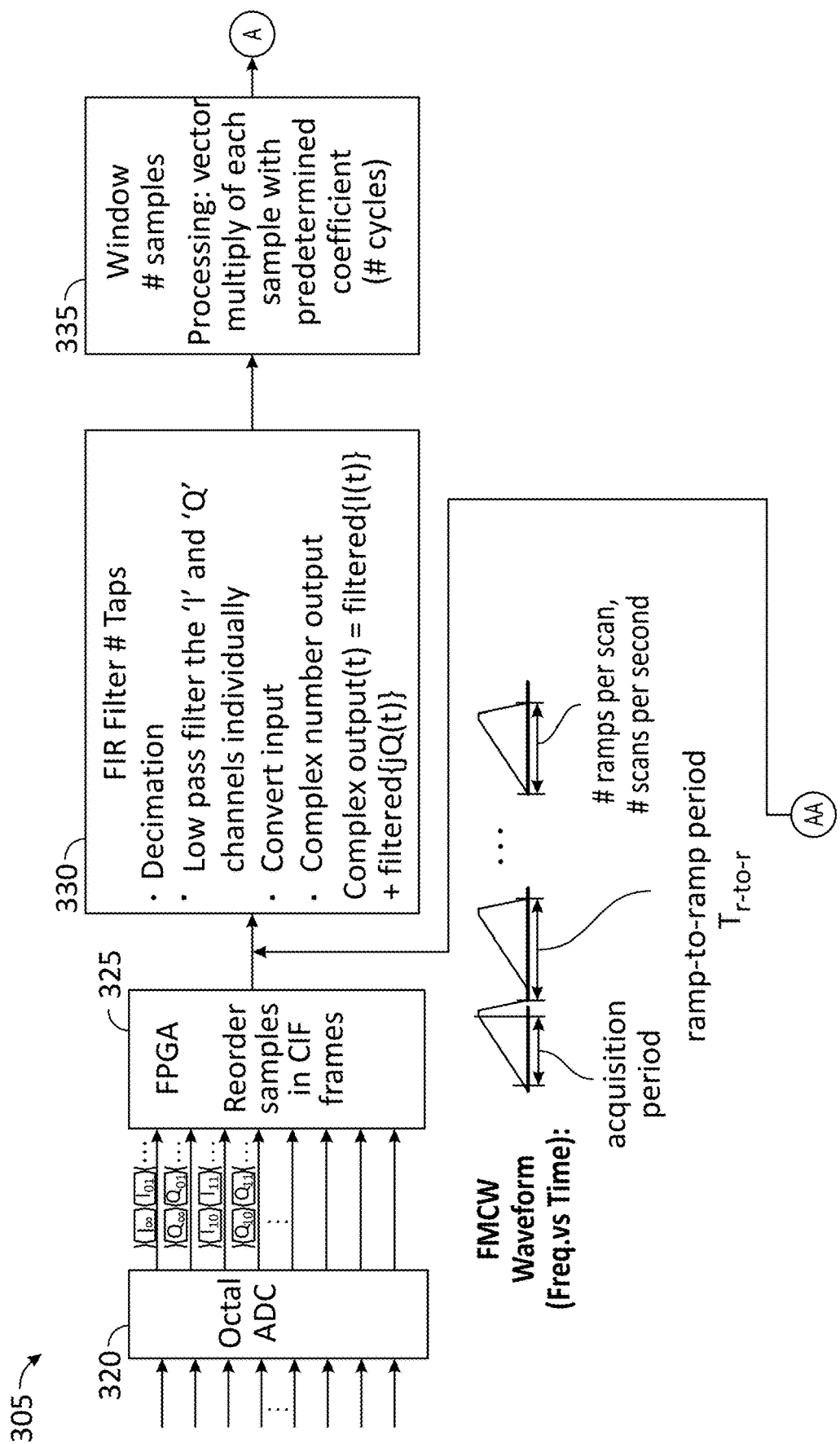
FIGS. 3A-3C each illustrates a block diagram of a portion of an example processing pipeline for facilitating radar data processing in accordance with one or more embodiments of the present disclosure.
Figure 3A:
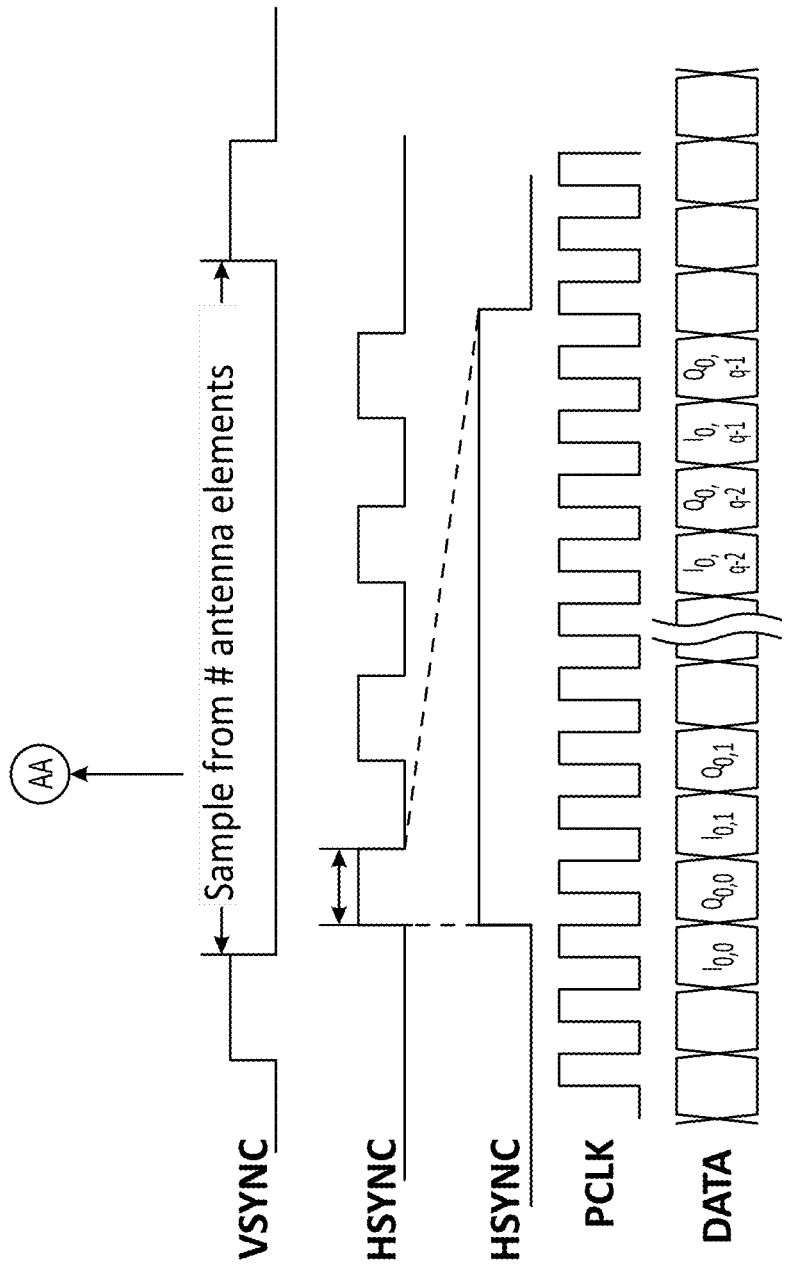
Figure 3B:
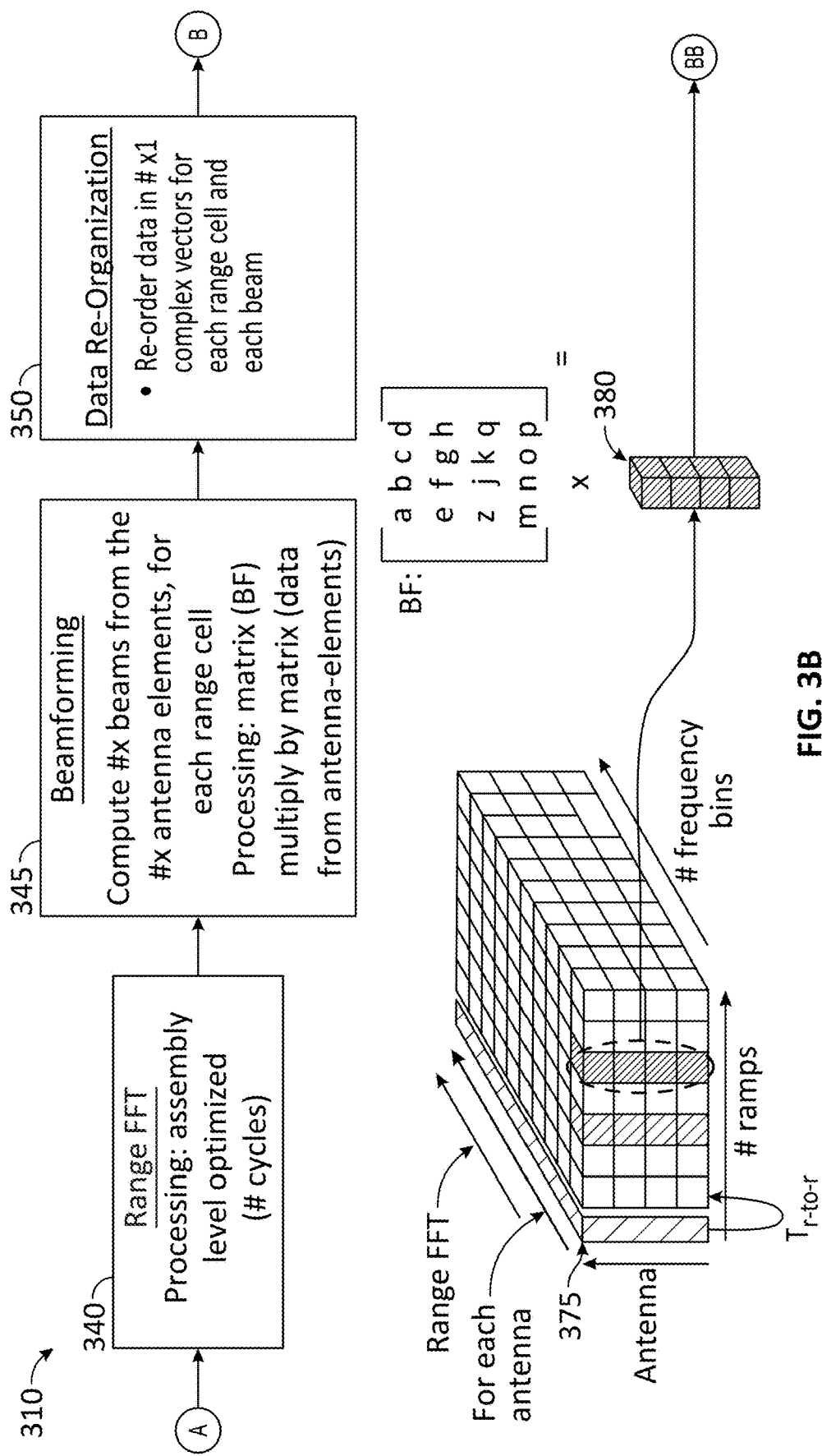
Figure 3B:
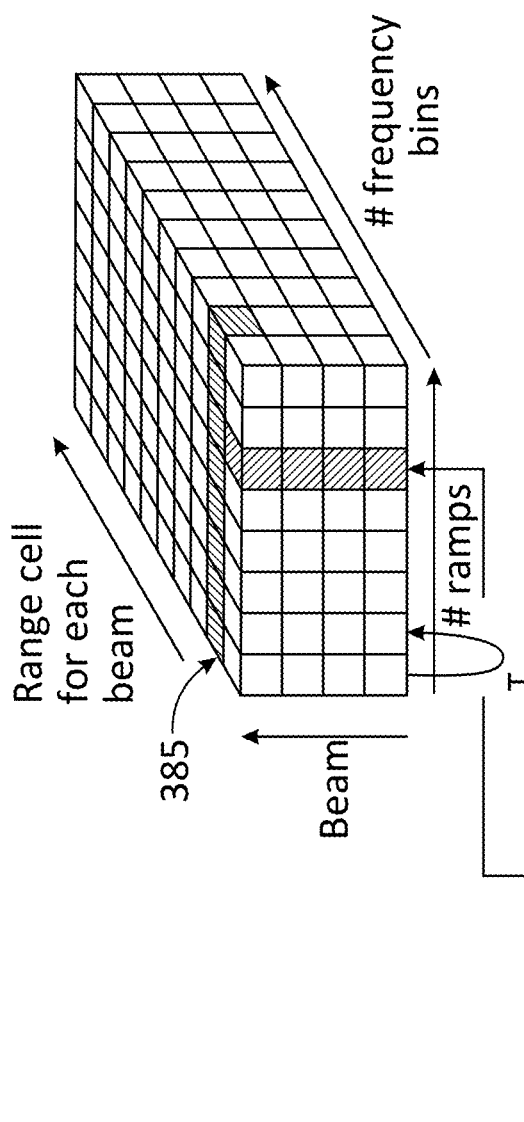
Figure 3C:
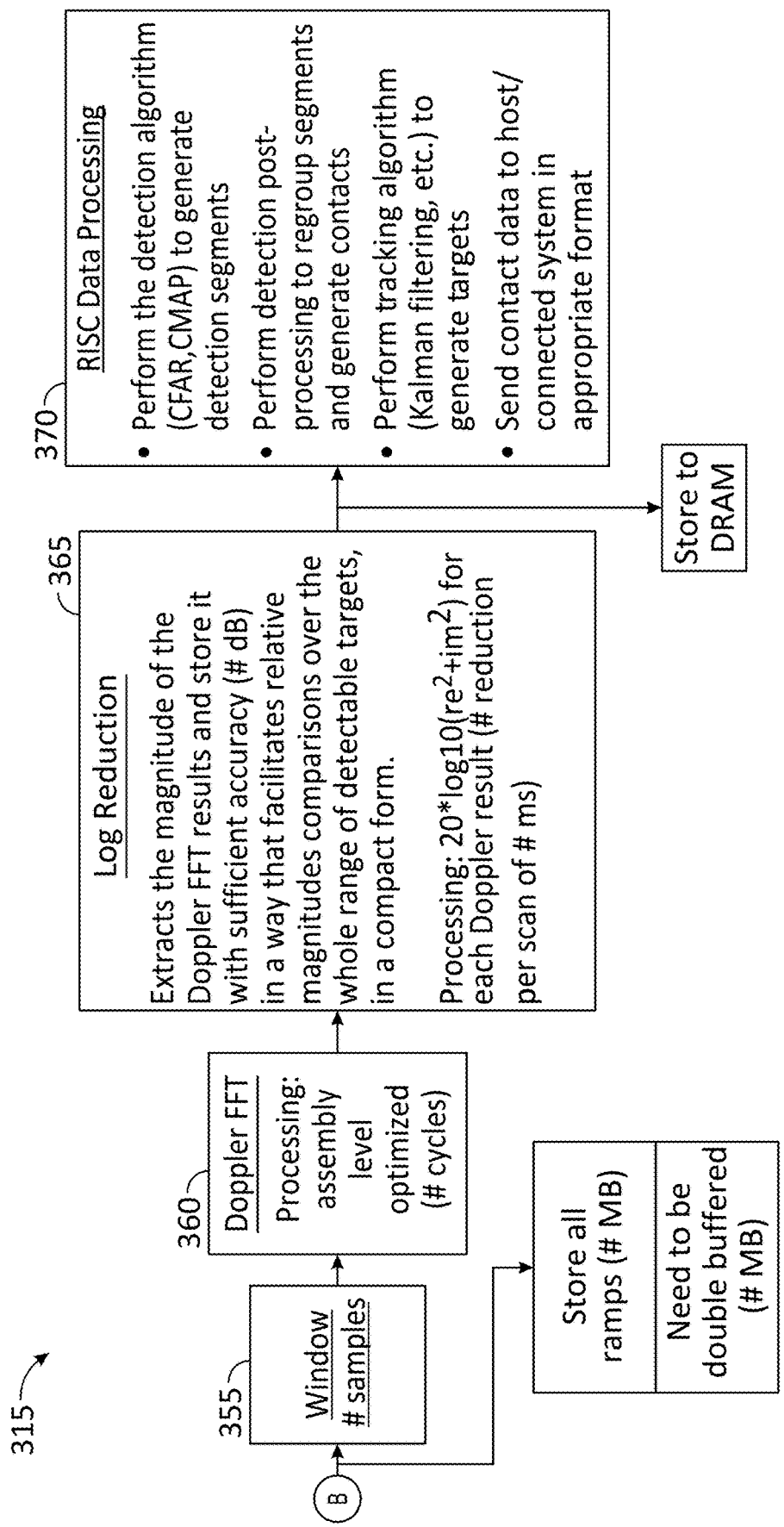

FIGS. 3A-3C each illustrates a block diagram of a portion 305, 310, and 315, respectively, of an example processing pipeline for facilitating radar data processing in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the processing system shown in FIGS. 3A-3C may be, may include, or may be a part of, the processing board 110 of FIG. 1. The processing pipeline may receive analog radar signals from the RF board 105 of FIG. 1. For explanatory purposes, the processing pipeline processes radar signals received by four antenna elements. In other cases, the processing pipeline may process radar signals received by fewer or more than four antenna elements.

Turning first to FIG. 3A, at block 320, an ADC circuit of the processing system receives analog radar signals and generates digital radar signals (e.g., digital representations of the analog radar signals). In some aspects, the analog radar signals may be based on return signals received in response to transmitted FMCW waveforms. In some cases, the return signals may be converted to I and Q signals (e.g., at the RF board 105). In one case, these I and Q signals may be provided to the ADC circuit for conversion to digital signals. In another case, the ADC circuit may generate these I and Q signals based on return signals received by the ADC circuit. The ADC circuit may receive analog radar signals and generate digitized I and Q signal pairs. In some cases, the analog radar signals may be based on a mixing of the transmitted signals and the return signals. Such mixing may be utilized to obtain a frequency difference between the transmitted and received signals. In some cases, the result of the mixing may be filtered (e.g., low-pass filtered).

In one case, the ADC circuit may receive I and Q signals for each of four antenna elements (e.g., each antenna element is associated with one I and Q signal pair). To facilitate processing of the four pairs of I and Q signals, the ADC circuit may be an octal ADC circuit that includes eight ADCs. Each of these eight ADCs may convert an I signal or a Q signal of one of the four antenna elements. The ADC circuit may be utilized to accommodate eight channels (e.g., one channel associated with each of eight ADCs), where each channel is associated with an I signal or a Q signal associated with one of the antenna elements. In an aspect, the ADC circuit may generate four I and Q signal pairs (e.g., one signal for each of eight ADC channels) based on the analog radar signals. For example, the four antenna elements may be identified as a zeroth, first, second, and third antenna element. On a zeroth ADC channel, the ADC circuit may generate I signals for the zeroth antenna element, of which $I_{0,0}$, $I_{0,1}$, $I_{0,q-2}$, and $I_{0,q-1}$ are shown in FIG. 3A. On a first ADC channel, the ADC circuit may generate Q signals for the zeroth antenna element, of which $Q_{0,0}$, $Q_{0,1}$, $Q_{0,q-2}$, and $Q_{0,q-1}$ are shown in FIG. 3A. On a third ADC channel, the ADC circuit may generate I signals for the first antenna element, of which $I_{1,0}$ and $I_{1,1}$ are shown in FIG. 3A. On a fourth ADC channel, the ADC circuit may generate Q signals for the first antenna element, of which $Q_{1,0}$ and $Q_{1,1}$ are shown in FIG. 3A. It is noted that identification of the antenna elements as zeroth, first, second, and third and the channels as zeroth, first, second, . . . , eighth, are arbitrary and utilized for convenience of referencing these antenna elements and channels. These four I and Q signal pairs may be referred to as digital radar data and may be provided as outputs of the ADC circuit. Each of $I_{0,0}$, $I_{0,1}$, $I_{0,q-2}$, $I_{0,q-1}$, $Q_{0,0}$, $Q_{0,1}$, $Q_{0,q-2}$, $Q_{0,q-1}$, and so forth is referred to as a pixel. As such, each ADC channel is associated with q pixels. FMCW waveforms may be characterized by an acquisition period (e.g., obtained by a number of I and/or Q samples associated with an ADC channel divided by a number of samples per second associated with the channel), a number of ramps per scan and a number of scans per second (e.g., to collectively provide a number of ramps per second), and a ramp-to-ramp period (e.g., denoted as $T_{r\text{-}to\text{-}r}$ and providing an amount of time per ramp or, equivalently, the inverse of the number of ramps per second). Each sample may be a signed value.

At block 325, an FPGA receives the digital radar data from the ADC circuit and converts the digital radar data into data structures having a format appropriate for being provided to CIF interfaces. Such data structures may be referred to as CIF frames (or simply frames) and have a camera format that can be provided to image processing pipelines, such as those provided by a VPU. For example, a VPU may have direct interfaces for receiving data from cameras (e.g., frames having a camera format). In an aspect, the FPGA may be referred to as a frame generation circuit (e.g., camera frame generation circuit) or a data converter, where such a frame generation circuit is configured to generate CIF frames based on the digital radar data. In this regard, although the data converter is implemented using an FPGA in FIG. 3A, other types of processors may be utilized to implement the FPGA. In an embodiment, a frame processing circuit (e.g., camera frame processing circuit) may be utilized to perform blocks 330, 335, 340, 345, 350, 355, 360, 365, and/or 370. The frame processing circuit may be a VPU. In one aspect, each ADC channel's input sample set is m samples (e.g., associated with one acquisition period), I and Q channels may be sampled independently, a pause between sample sets may have a duration provided by a difference between the acquisition period and the ramp-to-ramp period, and/or four channels are transmitted within a ramp-to-ramp period.

In an embodiment, as the digital radar data comes into the FPGA, the digital radar data gets grouped into CIF frames and provided (e.g., re-outputted) along with corresponding synchronization/clock signals to the CIF interfaces via a VSYNC line, a HSYNC line, a data line, and a PCLK line. In an embodiment, a VSYNC signal is asserted for each new CIF frame. An HSYNC signal is asserted for each line of digital radar data (e.g., 2q pixels where q is the number of pixels per ADC channel). A PCLK signal is asserted for each pixel (e.g., formed of a sample of n bits). In some cases, internal data counters control assertion and deassertion of the VSYNC line and the HSYNC line according to number counts (e.g., number of lines per frame, number of pixels per line) associated with the CIF frame, lines, and pixels.

Grouping of the digital radar data by the FPGA may be performed as follows. Each CIF frame has p lines (e.g., one line for each antenna element). Each line has 2q pixels, with I and Q samples alternating in each line. For example, in FIG. 3A, a zeroth line may be associated with a zeroth antenna element. The zeroth line may include pixels $I_{0,0}$, $Q_{0,0}$, $I_{0,1}$, $Q_{0,1}$, ..., $I_{0,q-2}$, $Q_{0,q-2}$, $I_{0,q-1}$, and $Q_{0,q-1}$. A first, second, and third line may include 2q pixels for the first, second, and third antenna element, respectively. It is noted that other manners by which to group the digital radar data to obtain desired data structures (e.g., data structures having a camera format appropriate for a desired VPU) may be utilized. Another example of grouping is described with respect to FIG. 4.

In some aspects, the FPGA may provide synchronization signals and data onto four lines. Each line may be associated with one antenna element. Each line may include samples from one antenna element for one ramp (e.g., one frequency sweep). The four lines may form a CIF frame of data. As shown in FIG. 3A, a VSYNC signal is provided prior to the data for the antenna element being provided. For a given antenna element, its I and Q samples may be alternating in a line. In one case, samples from each ADC may be co-located on a line and a camera interface (CIS) driver utilized to reorganize in line data.

At block 330, filtering is performed by an FIR filter on CIF frames received from the FPGA. In one example, the FIR filter may complete processing of four lines within a ramp-to-ramp period. The FIR filter may perform decimation to low pass filter and downsample the CIF frames. In one example, the FIR filter may downsample by 4, such that the r kilobytes of data per line becomes r/4 kilobytes of data per line. The FIR filter may low pass filter the I and Q signals individually. The FIR filter may generate an output $X(t) = \text{filtered}\{I(t)\} + \text{filter}\{jQ(t)\}$. For computational purposes, in some cases, the FIR filter may convert samples received from the FPGA to floating point numbers. As indicated previously, each line may include samples from one antenna element for one frequency sweep. After decimation, each line has q/4 samples. Each of these samples may be considered a pixel of a frame. The I and Q samples may be combined into complex number samples. In one case, samples may include real and imaginary floating point numbers.

At block 335, a window function is applied to the samples from the FIR filter. The window may be a q/4 sample window. The window may prepare a signal set for a Fast Fourier Transform (FFT). To apply the window, vector multiplication may be performed on each sample with a predetermined coefficient (e.g., a predetermined weight). In applying the window, q/4 samples per line for each antenna element is obtained. In some cases, the samples are complex numbers.

Turning now to FIG. 3B, at block 340, an FFT is applied to data of each line. The FFT gives a range of targets as a result of the constant frequency modulation of the source signal. In this regard, for a given frequency, a delay can be determined. As such, this FFT may be referred to as a range FFT (RFFT). In the radar data cube, a slow time axis provides a number of ramps (e.g., A number of ramps), a fast time axis provides a number of range bins for a given pulse and represents a range delay (e.g., q/4 frequency bins in this example), and a spatial axis provides a number of antenna elements (e.g., 4 in this example). In some cases, the FFT may be assembly-level optimized. The FFT may be performed on the data of each line. In one example, a complete FFT of one line can be performed in one-fourth of the ramp-to-ramp period. A portion 375 of the radar data cube represents a frame. The portion 375 is shown as slightly disjoint from the radar data cube for clarity of depicting a frame. A next frame is to the right of the portion 375.

Adjacent frames are spaced apart by the ramp-to-ramp period. In this regard, a frame is formed by 1 ramp by q/4 frequency bins by 4 antenna elements. Each line is q/4 pixels wide. Each block of the radar data cube is a pixel. In some cases, the pixel may include complex numbers. As output, the range FFT provides q/4 range cells per line. The range cell may be a complex number.

At block 345, beamforming is performed on a result of the FFT performed at block 340. To perform the beamforming, four beams from the four antenna elements may be computed for each range cell. A beamforming operation is performed for every frequency bin. In one example, q/4 matrix multiplications can be performed in the amount of time $T_{r\text{-}to\text{-}r}$ of the ramp-to-ramp period. In this regard, a 4×4 beamforming matrix (denoted as BF) may be matrix multiplied with a 4×1 matrix formed of a column of the radar data cube for a given ramp and frequency bin. This is denoted in FIG. 3B by $B = BF * E^T$, where BF is the beamforming matrix, $E^T$ is the transpose having dimensions 4×1 (e.g., dimensions of number of elements×one or, equivalently, a single column) of the radar data cube formed of range FFT results, and B is a vector having dimensions 4×1 (e.g., dimensions of number of beams×1) and formed of a beam's data to be subsequently re-ordered and utilized for a Doppler FFT. An example of $E^T$ is provided by a single column 380 of the radar data cube. In performing the beamforming, the beamforming matrix is multiplied by each column of every frame. A result of the beamforming is new frames, where each line is now a beam, as shown in the resulting radar data cube to the right in FIG. 3B. For each q/4 range cells, a 1×4 matrix of complex numbers (e.g., 4 beam data for each range cell) is obtained.

At block 350, data re-organization is performed. Results of the beamforming may be re-ordered in A×1 complex vectors for each range cell and each beam. An output of the data re-organization may include A×1 complex number vectors for q/4 range cells with 4 beams each (e.g., q number of A×1 vectors). In this regard, the re-organization provides four frames of A pixels per line by q/4 lines. One frame contains data from one beam, lines are data from the same range cells of each ramp, and pixels are data from different ramps. A next block operates on the same pixel of A consecutive frames. Such re-organization may facilitate efficient processing downstream of the data re-organization. One frame contains data from one beam, lines are data from the same range cells of each ramp, and pixels are data from different ramps.

Turning now to FIG. 3C, at block 355, a window is applied to the output from block 350. The window may be an A sample window. In an aspect, the output from block 350 is also stored. For example, results associated with a certain number of ramps may be stored. In some cases, results associated with ramps of a single scan may be stored. In some cases, the output from block 350 may be double buffered.

At block 360, an FFT is performed. The FFT of each bin gives a change of that particular frequency over several ramps and thus provide relative motion via the Doppler effect. This FFT may be utilized to determine velocities associated with targets. As such, the FFT performed at block 360 may be referred to as a Doppler FFT (DFFT). An output of the Doppler FFT may be A×1 complex vectors for q/4 range cells with 4 beams each (e.g., q number of A×1 vectors). In some cases, the FFT may be assembly-level optimized.

At block 365, a log reduction is performed. To perform the log reduction, a magnitude of the Doppler FFT results may be extracted and stored with sufficient accuracy in a manner to facilitate relative magnitudes comparisons over a whole range of detectable targets. A log reduction may generate results based on $20 \log_{10}(re^2+im^2)$, where re denotes a real component of a Doppler FFT result and im denotes an imaginary component of this Doppler FFT result. In some cases, an output of the log reduction is stored in memory, such as a dynamic random access memory (DRAM).

At block 370, reduced instruction set computer (RISC) data processing is performed. The RISC data processing may include performing detection operations to generate detection segments. Detections operations may include Constant False Alarm Rate (CFAR) schemes and/or Clutter-Map (CMAP) schemes. A CMAP may also be referred to as a background map. The RISC data processing may include performing detection post-processing to regroup segments and generate contacts, performing a tracking algorithm (e.g., Kalman filtering) to generate targets, and sending contact data to a host or an otherwise connected system in an appropriate format. The host or system may be connected to the processing circuit via an interface (e.g., also referred to as a customer interface), such as a UART interface, JTAG interface, and/or an Ethernet interface. In one embodiment, once segments are determined, segments may be grouped by a detection processing module to generate contacts. A tracker may correlate contacts from scan-to-scan to initiate, filter, and manage tracks.

Figure 4:
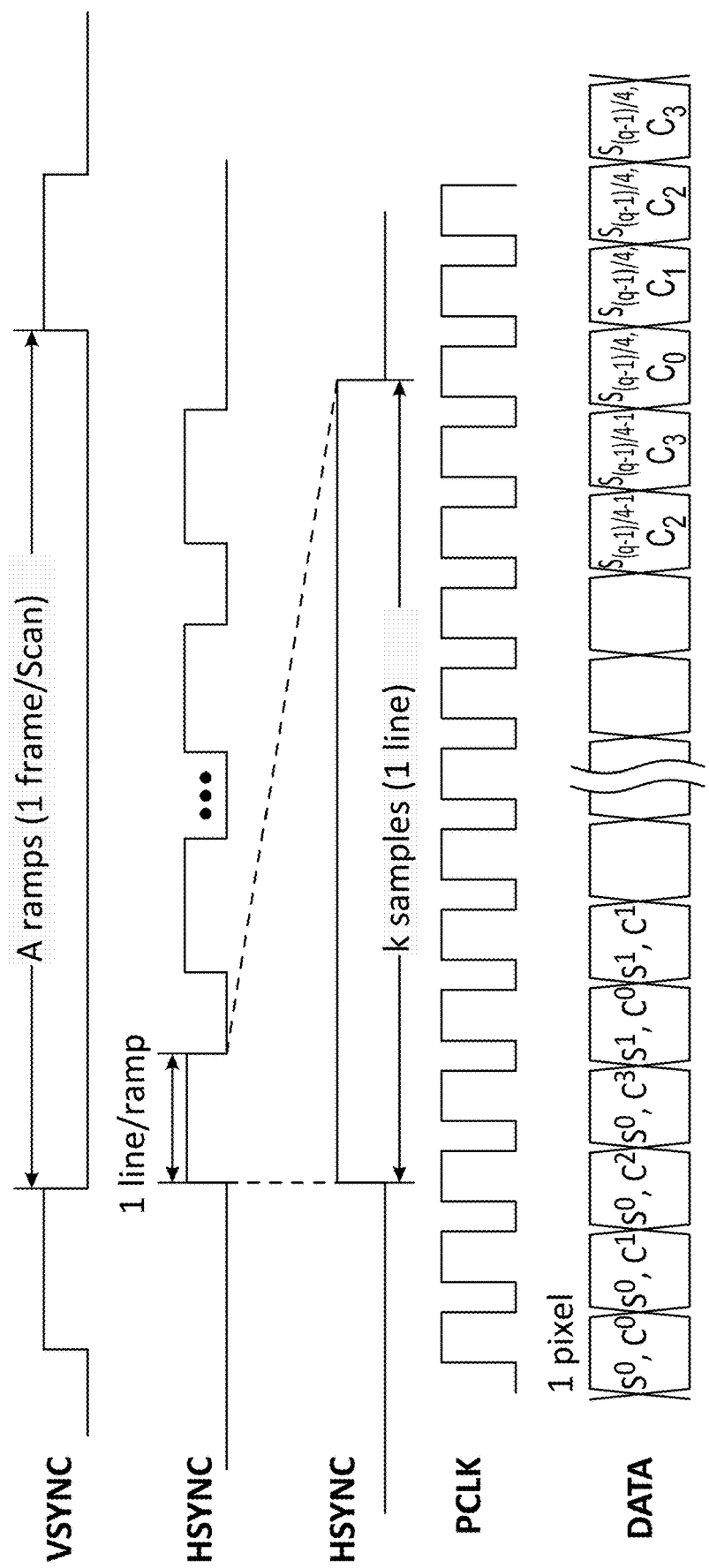
FIG. 4 illustrates signals associated with an example grouping of digital radar data in accordance with one or more embodiments of the present disclosure.

FIG. 4 illustrates signals associated with an example grouping of digital radar data in accordance with one or more embodiments of the present disclosure. In FIG. 4, grouping of the digital radar data by the FPGA may be performed as follows. The ADC circuit samples each frequency ramp k times for each antenna element. With four antenna elements, each frequency ramp is sampled 4k times. The FPGA groups each set of n/2 bits of I signals and n/2 bits of Q signals into n bit samples. Each n bit sample forms a pixel of a CIF frame. The FPGA groups the 4k samples (e.g., 4k pixels of n bits each) into a line of a CIF frame. Each line (e.g., denoted as DATA) of the CIF frame may be provided as follows: $[S_0, C_0] [S_0, C_1] [S_0, C_2] [S_0, C_3] [S_1, C_0] [S_1, C_1] \ldots [S_{q/2-1}, C_2] [S_{q/2-1}, C_3]$. As such, each line has 4k pixels. The notation $[S_x, C_y]$ represents an $x^{th}$ sample (e.g., each sample is n bits) of a $y^{th}$ channel (e.g., $y^{th}$ antenna element). For example, $[S_0, C_0]$ may include $I_{0,0}, I_{0,1}, \ldots I_{0,n/2-1}, Q_{0,0}, Q_{0,1}, \ldots Q_{0,n/2-1}$, and $[S_1, C_2]$ may include $I_{2,8}, I_{2,9}, \ldots, I_{2,n-1}, Q_{2,8}, Q_{2,9}, \ldots,$ and $Q_{2,n-1}$. In this regard, pixels are samples from the four antenna elements interleaved on each line. A CIF frame has data associated with A ramps. With each line of a CIF frame including data associated with one ramp, A number of HSYNC pulses (e.g., associated with A ramps and represented in part using ellipses in FIG. 4) are between two VSYNC pulses (e.g., each VSYNC pulse is associated with one CIF frame). In some cases, A ramps are included per scan and B scans can be performed per second. As such, in this embodiment, a CIF frame can be considered a frame having dimensions A rows by k columns (e.g., A lines with k samples for each line).

A VSYNC signal is asserted (e.g., at a logic high) for each new CIF frame. An HSYNC signal is asserted for each line of digital radar data (e.g., k pixels). A PCLK signal is asserted for each pixel (e.g., formed of a sample of n bits). In some cases, internal data counters control assertion and deassertion of the VSYNC line and the HSYNC line according to number counts (e.g., number of lines per frame, number of pixels per line) associated with the CIF frame, lines, and pixels.

In some embodiments, the grouping provided in FIG. 4 may be utilized with the various processing blocks provided in FIGS. 3A-3C. In an aspect, processing by each of blocks 330, 335, 340, 345, 350, 355, 360, 365, and/or 370 may be performed on four lines of a frame at a time. In FIG. 4, each frame has A number of lines. Such multi-vector processing provides a pipeline that allows processing of multiple pixels in parallel and staggered processing of these pixels. In this regard, in an iteration, lines 0-3 of a CIF frame may be performed by block 330 to obtain data associated with processing the lines 0-3 (referred to as processed lines 0-3). In a next iteration, lines 4-7 of the CIF frame may be performed by block 330 to obtain data associated with processing the lines 4-7 (referred to as processed lines 4-7) simultaneously with (e.g., substantially simultaneously with) the processed lines 0-3 being further processed by block 335 to obtain data associated with processing the processed lines 0-3 (referred to as further processed lines 0-3). In a still next iteration, lines 8-11 of the CIF frame may be performed by block 330 to obtain data associated with processing lines 8-11 simultaneously with (e.g., substantially simultaneously with) the processed lines 4-7 being further processed by block 335 and the further processed lines 0-3 being further processed by block 340. Operations performed in each block is performed within a certain time frame to allow parallel processing within each block and serial processing when outputs from one block are provided to a next block for processing. In some cases, memory may be appropriately allocated to facilitate efficient parallel and serial processing. It is noted that example processing times shown in FIGS. 3A-3C facilitate processing of multiple pixels in parallel and staggered processing of these pixels, where an output of a processing block is provided as input to a next processing block.

FIGS. 5A-5D each illustrates a block diagram of a portion 505, 510, 515, and 520, respectively, of an example processing pipeline for facilitating radar data processing in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. The description from FIGS. 3A-3C generally applies to FIGS. 5A-5D, with examples of differences between FIGS. 3A-3C and FIGS. 5A-5D and other description provided herein. In an embodiment, the processing system shown in FIGS. 5A-5D may be, may include, or may be a part of, the processing board 110 of FIG. 1. The processing system may receive analog radar signals from the RF board 105 of FIG. 1. For explanatory purposes, the processing system processes radar signals received by four antenna elements. In other cases, the processing system may process radar signals received by fewer or more than four antenna elements.

Figure 5A:
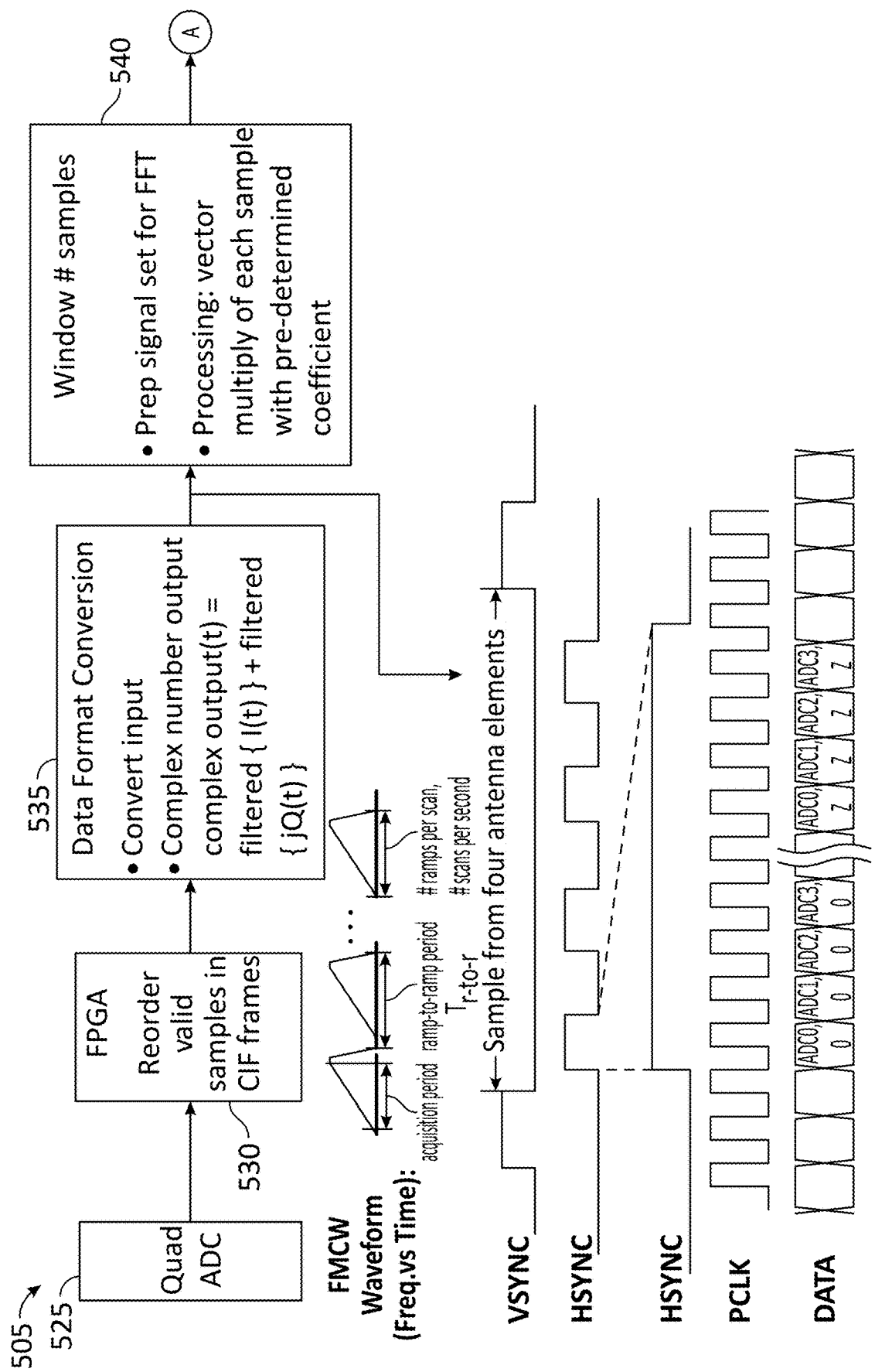
FIGS. 5A-5D each illustrates a block diagram of a portion of an example processing pipeline for facilitating radar data processing in accordance with one or more embodiments of the present disclosure.

Turning first to FIG. 5A, at block 525, an ADC circuit of the processing system receives analog radar signals and generates digital radar signals. In some aspects, the analog radar signals may be based on return signals received in response to transmitted FMCW waveforms. In some cases, the return signals may be converted to I and Q signals, and these I and Q signals provided to the ADC circuit for conversion to digital signals. The ADC circuit may be a quad ADC circuit that include four ADCs. Each ADC is associated with a channel, and each channel is associated with one of the four antenna elements. The ADC circuit may include decimation and in-line filtering. For each of the four antenna elements, the ADC circuit 420 provides free running output composed of n-bit samples of I signals.

At block 530, an FPGA receives the digital radar data from the ADC circuit and converts the digital radar data into CIF frames that can be provided to image processing pipelines, such as those provided by a VPU. The conversion may involve reordering valid samples into CIF frames. In this regard, although the data converter is implemented using an FPGA in FIG. 5A, other types of processors may be utilized to implement the FPGA. In an embodiment, a frame processing circuit (e.g., camera frame processing circuit) may be utilized to perform blocks 535, 540, 545, 550, 555, 560, 565, 570, 580, 585, 590, and/or 595. The frame processing circuit may be a VPU. In an embodiment, as the digital radar data comes into the FPGA, the digital radar data gets grouped into CIF frames and provided (e.g., re-outputted) along with corresponding synchronization/clock signals to the CIF interfaces via a VSYNC line, a HSYNC line, a data line, and a PCLK line. In an embodiment, a VSYNC signal is asserted for each new CIF frame. An HSYNC signal is asserted for each line of digital radar data. A PCLK signal is asserted for each pixel. In some cases, internal data counters control assertion and deassertion of the VSYNC line and the HSYNC line according to number counts (e.g., number of lines per frame, number of pixels per line) associated with the CIF frame, lines, and pixels. A line (denoted as DATA) of the CIF frame may include $ADC_{0,0}$, $ADC_{1,0}$, $ADC_{2,0}$, $ADC_{3,0}$, and so forth, such that samples from each of the four antenna elements are interleaved on each line.

At block 535, data format conversion is performed. In some cases, an input to block 430 is converted to floating point numbers of a certain size, such as float32. An output may have the format $X(t)=\text{filtered}\{I(t)\}+\text{filter}\{jQ(t)\}$. A line includes samples from one antenna element for one frequency sweep. I signals and Q signals may be combined in a complex number sample. In this architecture, Q may be zero. Samples may include real and imaginary floating point numbers.

At block 540, a window is applied to the samples from block 430. The window may prepare a signal set for an FFT. To apply the window, vector multiplication may be performed on each sample with a predetermined coefficient (e.g., a predetermined weight).

Figure 5B:
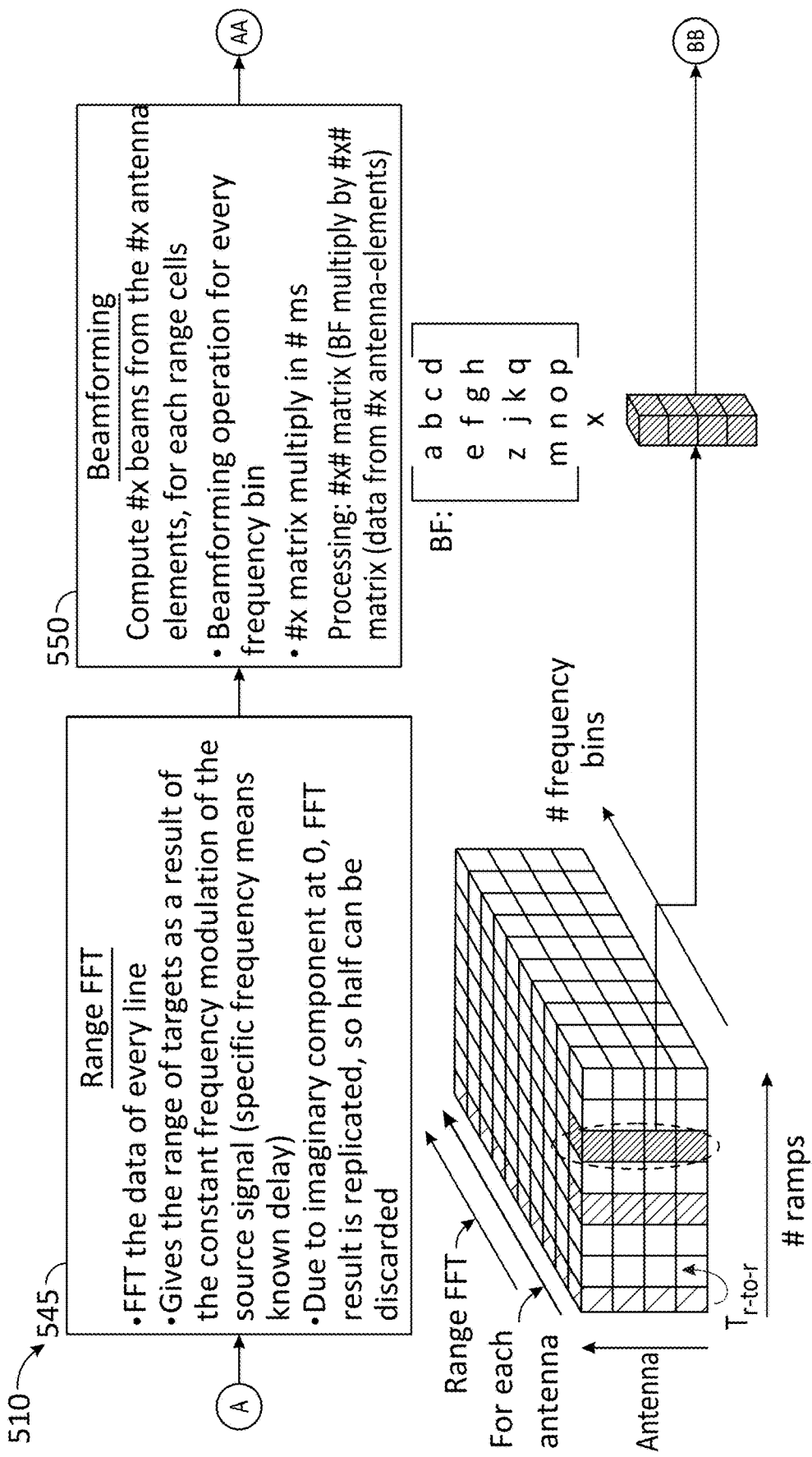
Figure 5B:
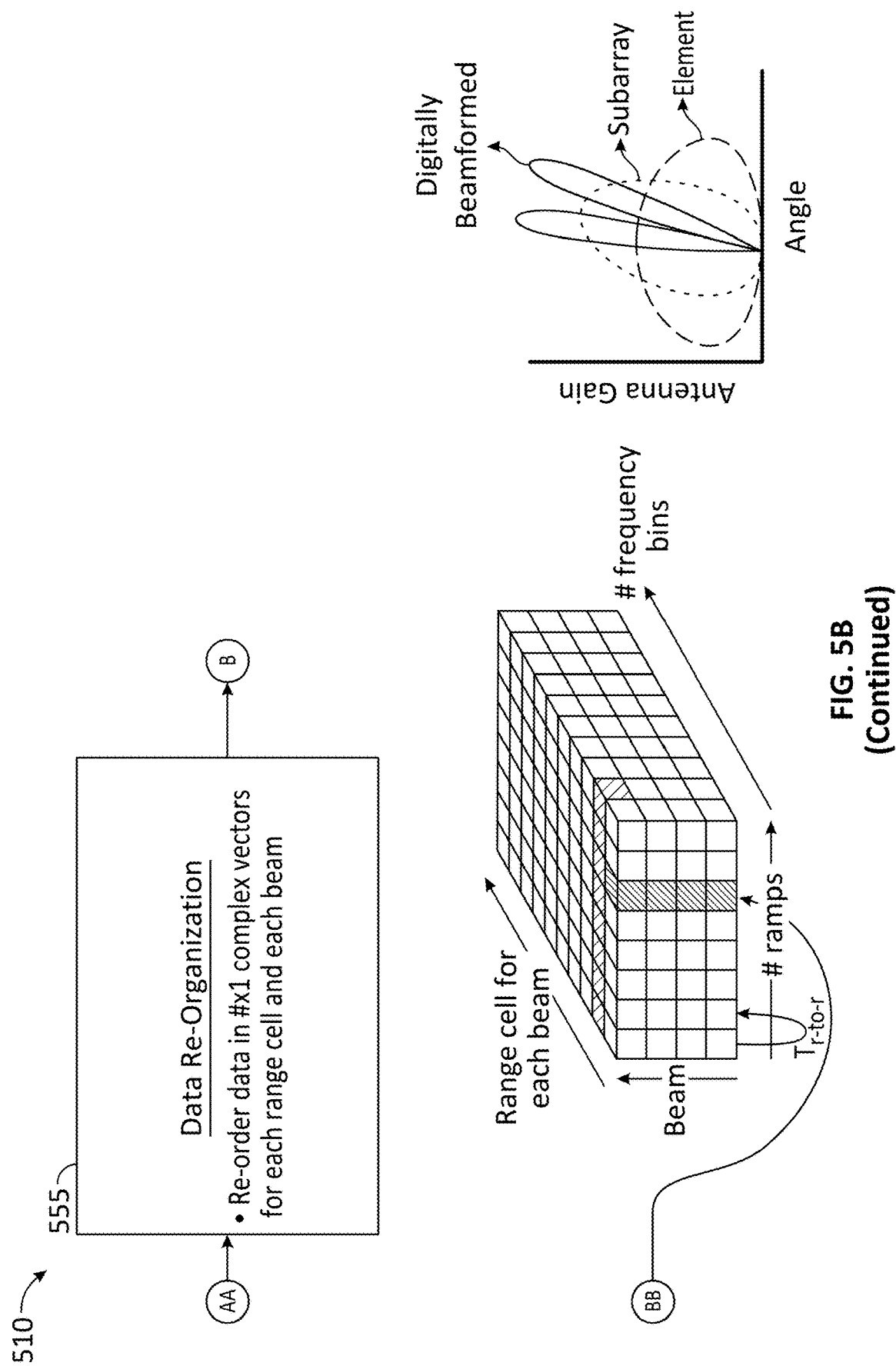

Turning now to FIG. 5B, at block 545, a range FFT is applied to data of each line. In some cases, when the imaginary component is 0, the FFT result may be replicated, so that half can be discarded. At block 550, beamforming is performed on a result of the FFT performed at block 545. To perform the beamforming, four beams from the four antenna elements may be computed for each range cell. A beamforming operation is performed for every frequency bin. In one example, a certain number of matrix multiplications can be performed within ramp-to-ramp period $T_{r\text{-}to\text{-}r}$. In this regard, a 4×4 beamforming matrix (denoted as BF) may be matrix multiplied with a 4×1 matrix formed of a column of the radar data cube for a given ramp and frequency bin. For each range cell, a 1×4 matrix of complex numbers (e.g., 4 beam data for each range cell) is obtained. At block 555, data re-organization is performed. Results of the beamforming may be re-ordered in complex vectors for each range cell and each beam.

Figure 5C:
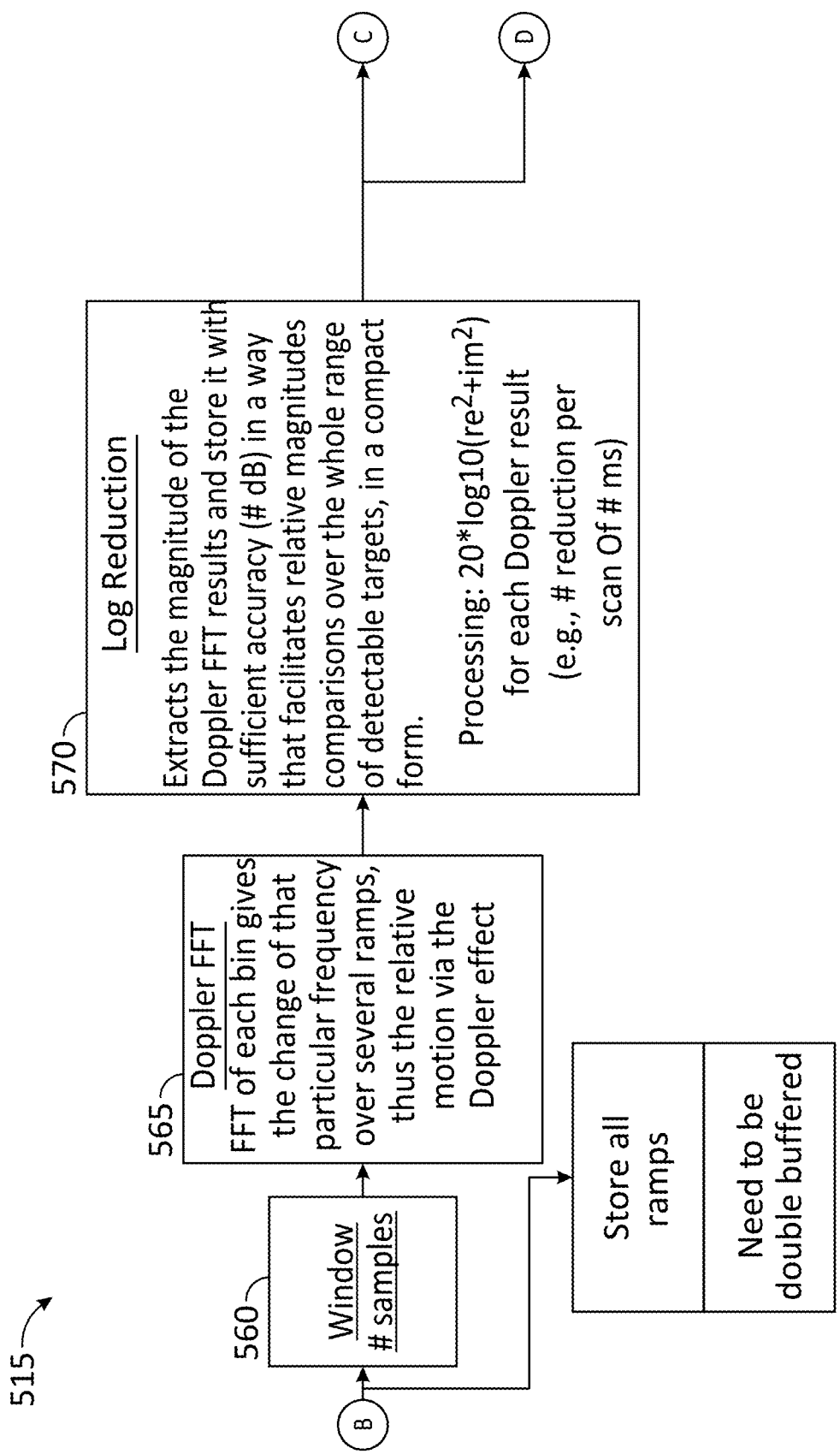

Turning now to FIG. 5C, at block 560, a window is applied to the output from block 555. In an aspect, the output from block 555 is also stored. For example, results associated with the ramps may be stored. In some cases, the output from block 555 may be double buffered. At block 565, a Doppler FFT is performed. An output of the Doppler FFT may be complex vectors for the range cells with 4 beams each. At block 570, a log reduction is performed. In some cases, an output of the log reduction is stored in memory, such as a DRAM. 3D data may include beam ID, azimuth, range, and/or speed/doppler index.

Figure 5D:
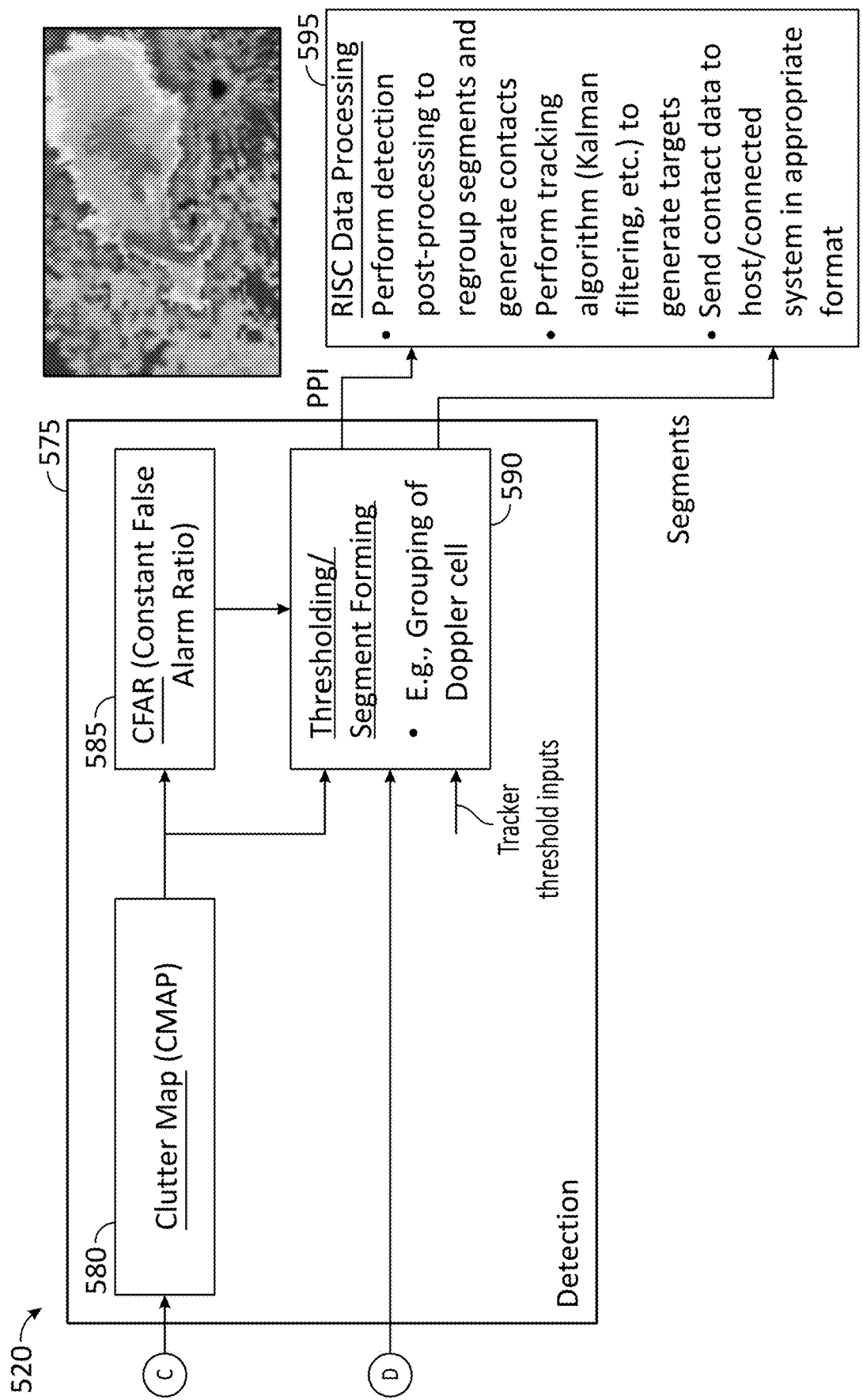

Turning now to FIG. 5D, at block 575, detection operations are performed to generate detection segments. Block 575 includes block 580, 585, and 590. Various aspects of the detection operations (e.g., CMAP, CFAR) described with respect to FIG. 3C also apply to blocks 575, 580, 585, and 590 of FIG. 5D. At block 580, CMAP is performed based at least on the output of the log reduction from block 570. At block 585, CFAR is performed based at least on an output of block 580. At block 590, thresholding/segment forming is performed. The thresholding/segment forming may generate PPI and segments. The thresholding/segment forming may include grouping of doppler cells. The threshold/segment forming may be based on an output from block 570, block 580, block 585, and tracker threshold inputs.

At block 595, RISC data processing is performed. The RISC data processing may include performing detection post-processing to regroup segments and generate contacts, performing a tracking algorithm (e.g., Kalman filtering) to generate targets, and sending contact data to a host or an otherwise connected system in an appropriate format. The host or system may be connected to the processing circuit via an interface (e.g., also referred to as a customer interface), such as a UART interface, JTAG interface, an Ethernet interface.

Figure 6:
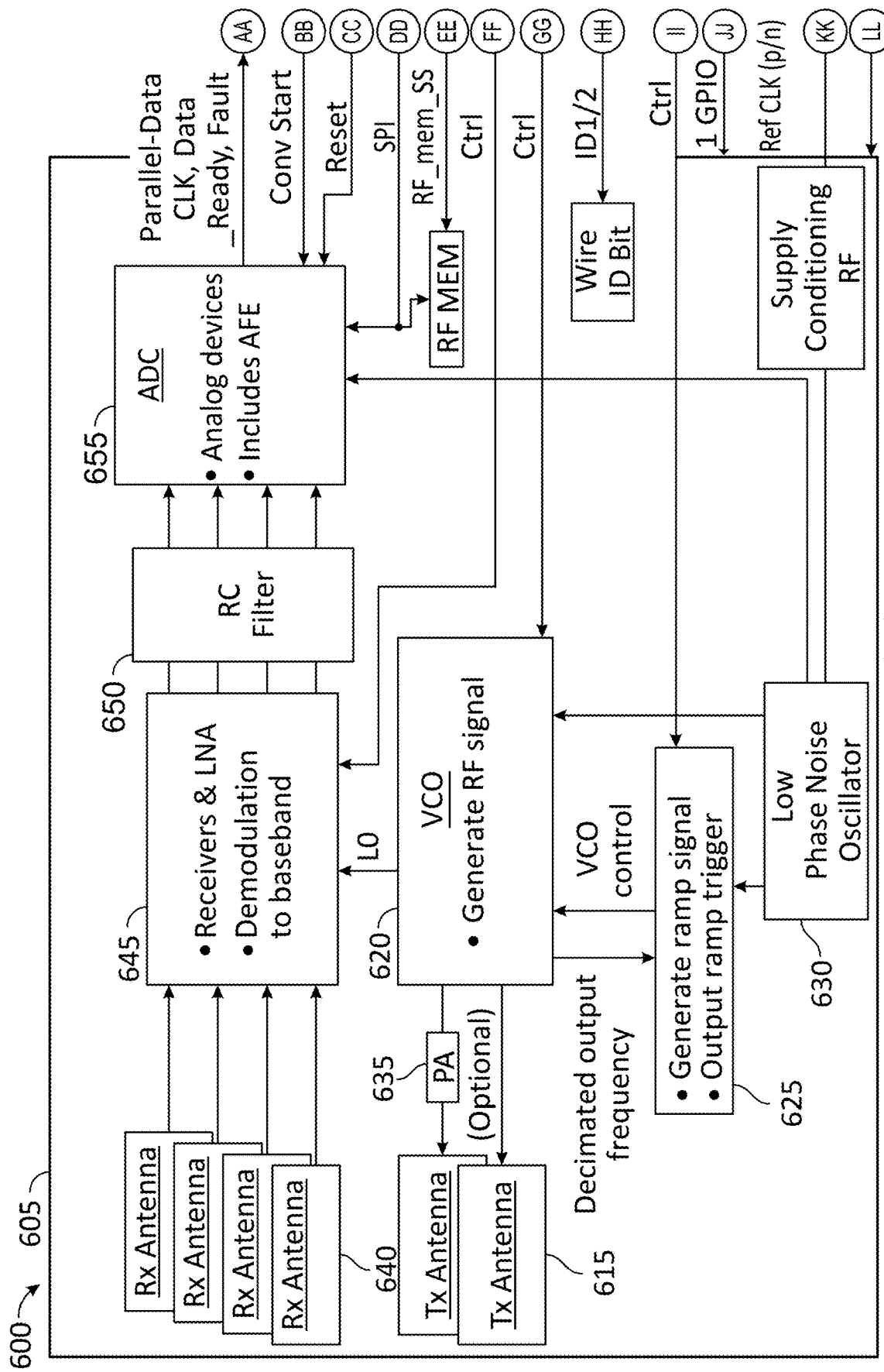
FIGS. 6 and 7 each illustrates a block diagram of an example radar system in accordance with one or more embodiments of the present disclosure.
Figure 6:
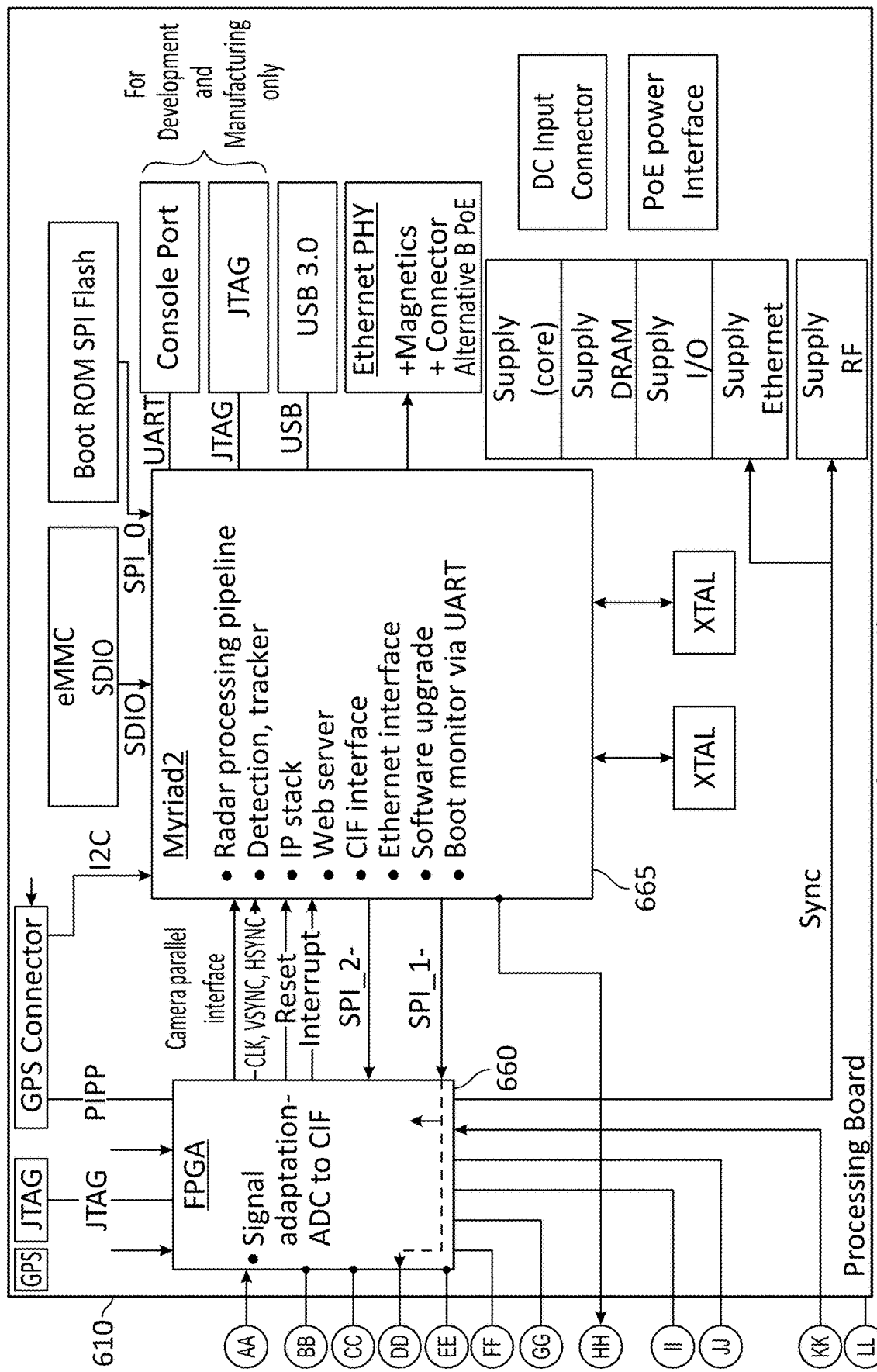

FIG. 6 illustrates a block diagram of a radar system 600 including a RF board 605 and a processing board 610 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the radar system 600 may be, may include, or may be a part of, the radar system 100 of FIG. 1. In this regard, the RF board 605 may be, may include, may be a part of the RF board 105 of FIG. 1, and/or the processing board 610 may be, may include, may be a part of the processing board 610 of FIG. 1.

The RF board 605 primarily includes analog components for facilitating radar operation. On a transmit side, the RF board 605 includes TX antenna elements (e.g., two in FIG. 6, one of which is labeled 615) and appropriate circuitry to generate radar signals and provide such radar signals to the TX antenna elements, such that these radar signals can be transmitted by the TX antenna elements. The circuitry includes a waveform generator that generates various waveforms to be utilized as radar signals. Such waveforms may include pulses of various lengths (e.g., different pulse widths), FMCW signals, and/or other waveforms appropriate for radar applications. FMCW signals may be implemented, for example, as rising, falling, or rising/falling frequency sweeps (e.g., upchirps, downchirps, or up/down chirps). In some cases, the waveforms may be beamformed waveforms. In FIG. 6, the waveform generator may be implemented using a VCO 620, a ramp generator 625, and an oscillator 630. The VCO 620 may provide a decimated output frequency to the ramp generator 625. The ramp generator 625 may generate ramp signals and output ramp triggers. The ramp generator may provide VCO control to the VCO 620. The oscillator 630 may be a low phase noise oscillator (e.g., 38.4 MHz low phase noise oscillator). The oscillator 630 may provide its output to the VCO 620, the ramp generator 625, and an ADC circuit 655. The circuitry may include one or more power amplifiers (e.g., power amplifier 635) that receive the radar signals from the waveform generator and drive the radar signals on the TX antenna elements. In some cases, characteristics of the radar signals may be based at least in part from control signals received by the RF board 605 from the processing board 610.

On a receive side, the RF board 605 may include RX antenna elements (e.g., four in FIG. 6, one of which is labeled 640) and circuitry to process radar signals received by the RX antenna elements. The RX antenna elements can receive radar signals that are reflections by targets/objects of the transmitted radar signals. These received radar signals may be referred to as return signals. The RF board 605 may include appropriate circuitry to process these return signals. The circuitry may include one or more LNAs (e.g., part of a circuit 645) for amplifying the received radar signals. The circuitry may include a demodulator (e.g., part of the circuit 645) to receive the radar signals and convert the radar signals to baseband. In some cases, the demodulator may generate I signals and Q signals based on the received radar signals. The circuitry may include filters (e.g., low-pass filters) to be applied to the radar signals (e.g., baseband radar signals). In one example, a filter circuit 650 includes four RC filters. The circuitry may include the ADC circuit 655 to convert the radar signals (e.g., filtered radar signals) to convert filtered radar signals, which are analog signals, to digital radar signals. In one example, the ADC circuit 655 may be a quad ADC. The ADC circuit 655 may include an analog front end (AFE). The digital radar signals are provided to the processing board 610 for further processing to facilitate radar applications (e.g., target detection applications). The digital radar signals may be provided via eight parallel channels, along with other appropriate signals (e.g., clock signals, data ready signals, fault signals, and/or other signals).

The processing board 610 includes appropriate circuitry to receive the digital radar signals from the RF board 605 and process the digital radar signals. The processing board 610 includes an FPGA 660 and a processing circuit 665. The FPGA 660 may receive the digital radar data from the ADC circuit 655 and convert the digital radar data into a camera format. In this regard, the FPGA 660 may provide a signal adaptation from an ADC output to CIF. An interface for the digital radar data may include a camera 16-bit, parallel interface. In an embodiment, the FPGA 660 may perform block 325 and 530 of FIGS. 3A and 5A, respectively.

The processing circuit 665 may generate detection data based on the digital radar signals, which are provided as part of CIF frames from the FPGA 660. The processing circuit 665 has interfaces appropriate for receiving the digital radar signals and synchronization signals (e.g., clock signals, VSYNC signals, HSYNC signals) from the FPGA 660. In one case, the detection data may be utilized to generate images, alerts, and/or other information that can be provided to a user to enhance situational awareness. To generate the detection data, the processing circuit 665 may perform appropriate data organization and data format conversions, windowing and/or other filtering, and data transformations (e.g., Fourier Transforms). In FIG. 6, the processing circuit 665 is a Myriad™ processor, although other processors (e.g., and/or other VPUs) may be utilized alternative to or in addition to the Myriad™ processor. The processing board 610 includes other components. The processing board 610 may include or may be otherwise coupled to a GPS, an IMU, power supplies, and/or oscillators (e.g., XTAL). The processing board 110 may include one or more interfaces for receiving power, communicating with external devices, and/or primarily for development and manufacturing, such a UART interface, a JTAG interface, an Ethernet interface, a USB interface, a Secure Digital Input Output (SDIO) interface, and/or other interfaces. In an embodiment, the processing circuit 665 may perform block 330, 335, 340, 345, 350, 355, 360, 365, and/or 370 of FIGS. 3A-3C, and/or blocks 535, 540, 545, 550, 555, 560, 565, 570, 575, 580, 585, 590, and/or 595 of FIGS. 5A-5D.

Figure 7:
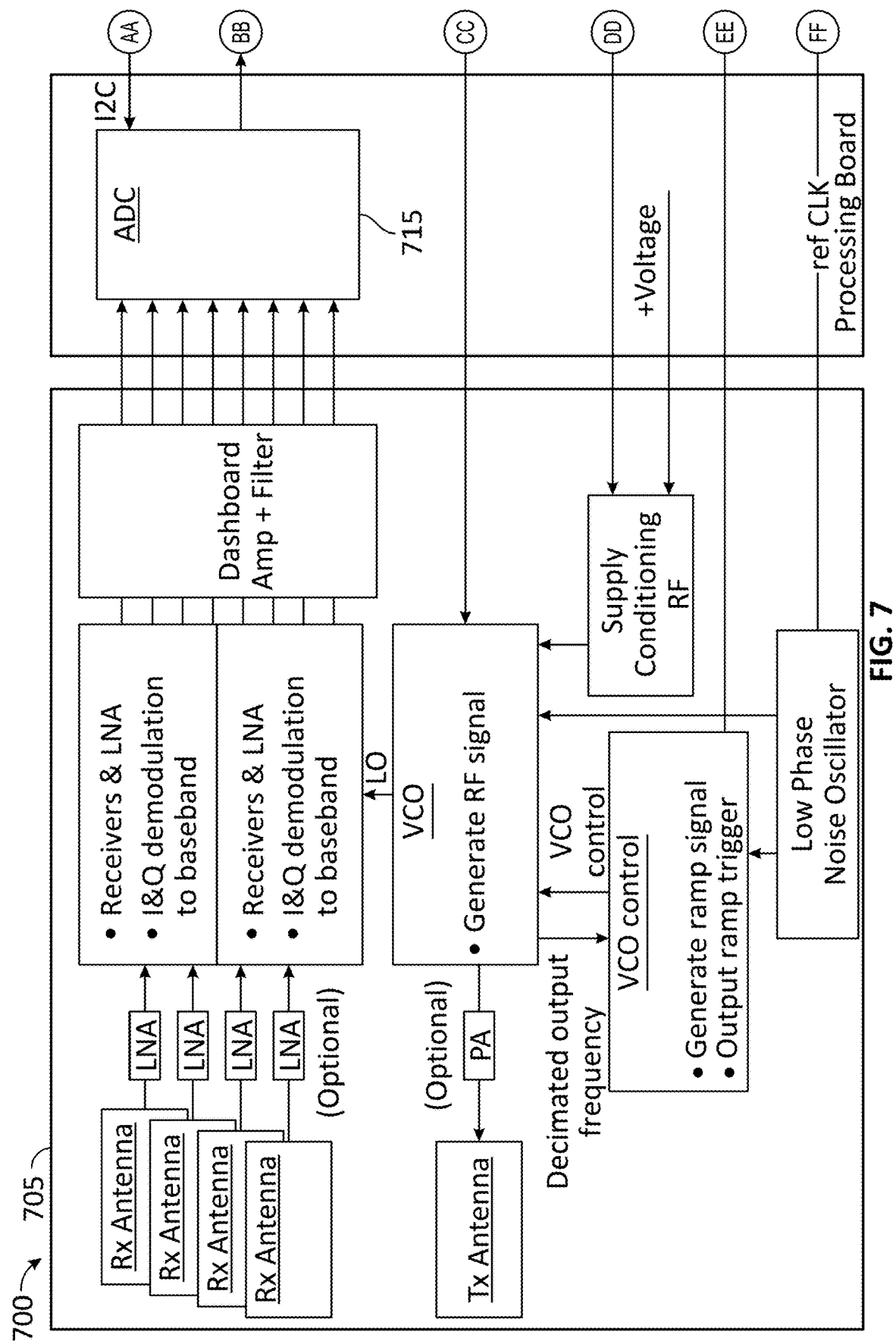
Figure 7:
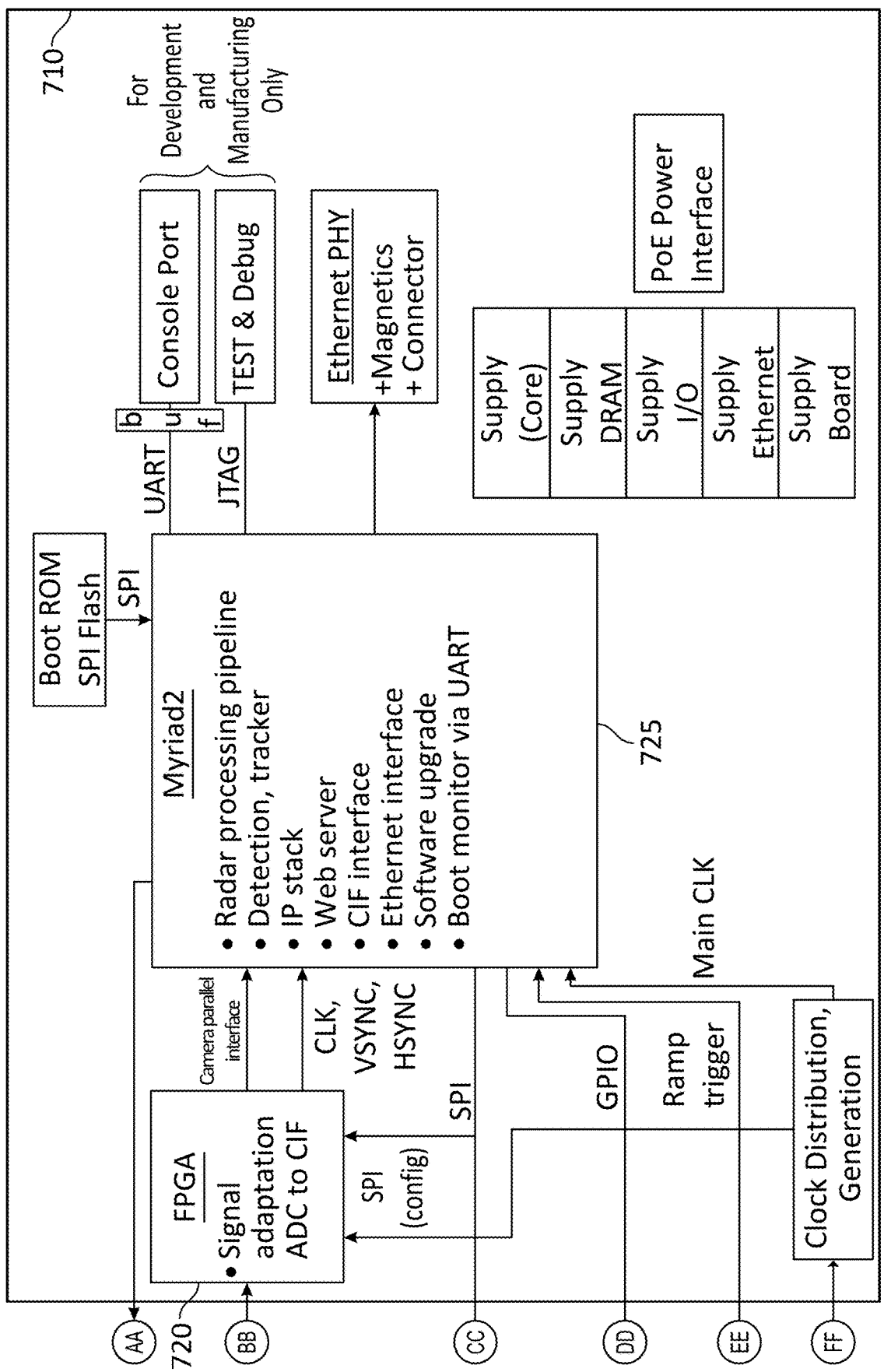

FIG. 7 illustrates a block diagram of a radar system 700 including a RF board 705 and a processing board 710 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the radar system 700 may be, may include, or may be a part of, the radar system 100 of FIG. 1. In this regard, the RF board 705 may be, may include, may be a part of the RF board 105 of FIG. 1, and/or the processing board 710 may be, may include, may be a part of the processing board 710 of FIG. 1. The description from FIG. 6 generally applies to FIG. 7, with examples of differences between FIG. 6 and FIG. 7 and other description provided herein.

In the radar system 700, an ADC circuit 715 is implemented as part of the processing board 710. The ADC circuit 715 may digitize analog baseband signals received from the RF board 705. The ADC circuit 715 may be an octal ADC. In some cases, the ADC circuit 715 may include support circuitry. The ADC circuit 715 may have an appropriate interface/pin count for providing the digital radar signals to an FPGA 720. The FPGA 720 may provide signal adaption from ADC outputs to CIF frames. In an embodiment, the FPGA 720 may perform block 325 and 530 of FIGS. 3A and 5A, respectively. A processing circuit 725 may generate detection data based on the digital radar signals, which are provided as part of CIF frames from the FPGA 720. The processing circuit 725 has interfaces appropriate for receiving the digital radar signals and synchronization signals (e.g., clock signals, VSYNC signals, HSYNC signals) from the FPGA 720. In FIG. 7, the processing circuit 725 is a Myriad™ processor, although other processors (e.g., and/or other VPUs) may be utilized alternative to or in addition to the Myriad™ processor. In an embodiment, the processing circuit 665 may perform block 330, 335, 340, 345, 350, 355, 360, 365, and/or 370 of FIGS. 3A-3C, and/or blocks 535, 540, 545, 550, 555, 560, 565, 570, 575, 580, 585, 590, and/or 595 of FIGS. 5A-5D. In an embodiment, the FPGA 720 may be, may include, or may be a part of the FPGA 660 of FIG. 6, and/or the processing circuit 725 may be, may include, or may be a part of the processing circuit 665 of FIG. 6.

Figure 8:
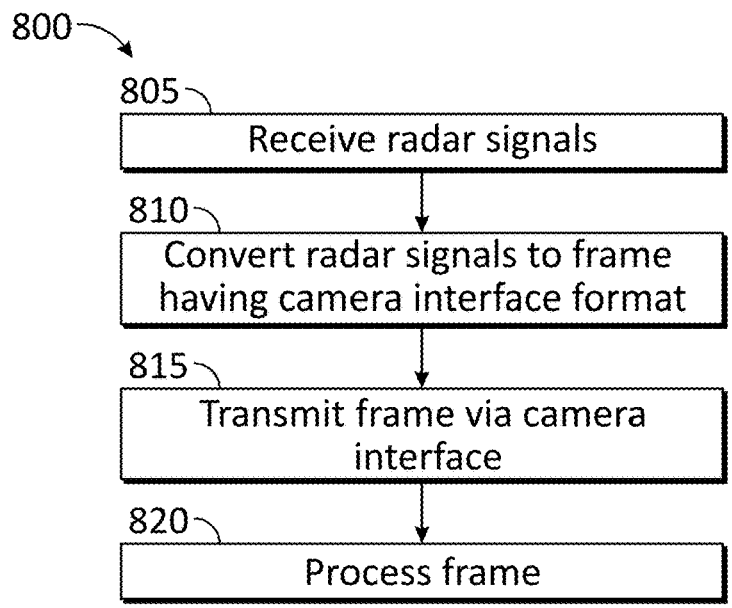
FIG. 8 illustrates a flow diagram of an example process for facilitating radar data processing in accordance with one or more embodiments of the present disclosure.

FIG. 8 illustrates a flow diagram of an example process 800 for facilitating radar data processing in accordance with one or more embodiments of the present disclosure. For explanatory purposes, the example process 800 is primarily described herein with reference to components of FIGS. 2 and 3A-3C; however, the example process 800 is not limited to components of FIGS. 2 and 3A-3C. The blocks of example process 800 are described herein as occurring in serial, or linearly (e.g., one after another). However, multiple blocks of example process 800 may occur in parallel. In addition, the blocks of example process 800 need not be performed in the order shown and/or one or more of the blocks of example process 800 need not be performed.

At block 805, a frame generation circuit (e.g., the FPGA 215) receives radar signals. The radar signals may be based on return signals received via RX antenna elements. These return signals may be processed (e.g., converted to baseband, filtered) and then digitized by the ADC circuit 210. At block 810, the frame generation circuit converts the radar signals to a frame having a camera interface format. This frame may be referred to as a CIF frame. At block 815, the frame generation circuit transmits the frame on a camera interface. In some cases, the FGPA 215 may transmit the frame along with synchronization and clock signals (e.g., VSYNC, HSYNC, PCLK). The frame may include multiple lines, where each line has multiple pixels. Each line may include data associated with at least one of a plurality of RX antenna elements.

At block 820, a frame processing circuit (e.g., the VPU 220) processes the frame received from the frame generation circuit via the camera interface. In an embodiment, block 820 may include blocks 330, 335, 340, 345, 350, 355, 360, 365, and/or 370 of FIGS. 3A-3C. As an example, in an iteration, lines 0-3 of the CIF frame may be performed by block 330 to obtain data associated with processing the lines 0-3 (referred to as processed lines 0-3). In a next iteration, lines 4-7 of the CIF frame may be performed by block 330 to obtain data associated with processing the lines 4-7 (referred to as processed lines 4-7) simultaneously with (e.g., substantially simultaneously with) the processed lines 0-3 being further processed by block 335 to obtain data associated with processing the processed lines 0-3 (referred to as further processed lines 0-3). In a still next iteration, lines 8-11 of the CIF frame may be performed by block 330 to obtain data associated with processing lines 8-11 simultaneously with (e.g., substantially simultaneously with) the processed lines 4-7 being further processed by block 335 and the further processed lines 0-3 being further processed by block 340. Operations performed in each block is performed within a certain time frame to allow parallel processing within each block and serial processing when outputs from one block are provided to a next block for processing. In some cases, memory may be appropriately allocated to facilitate efficient parallel and serial processing. It is noted that example processing times shown in FIGS. 3A-3C facilitate processing of multiple pixels in parallel and staggered processing of these pixels, where an output of a processing block is provided as input to a next processing block.

Figure 9:
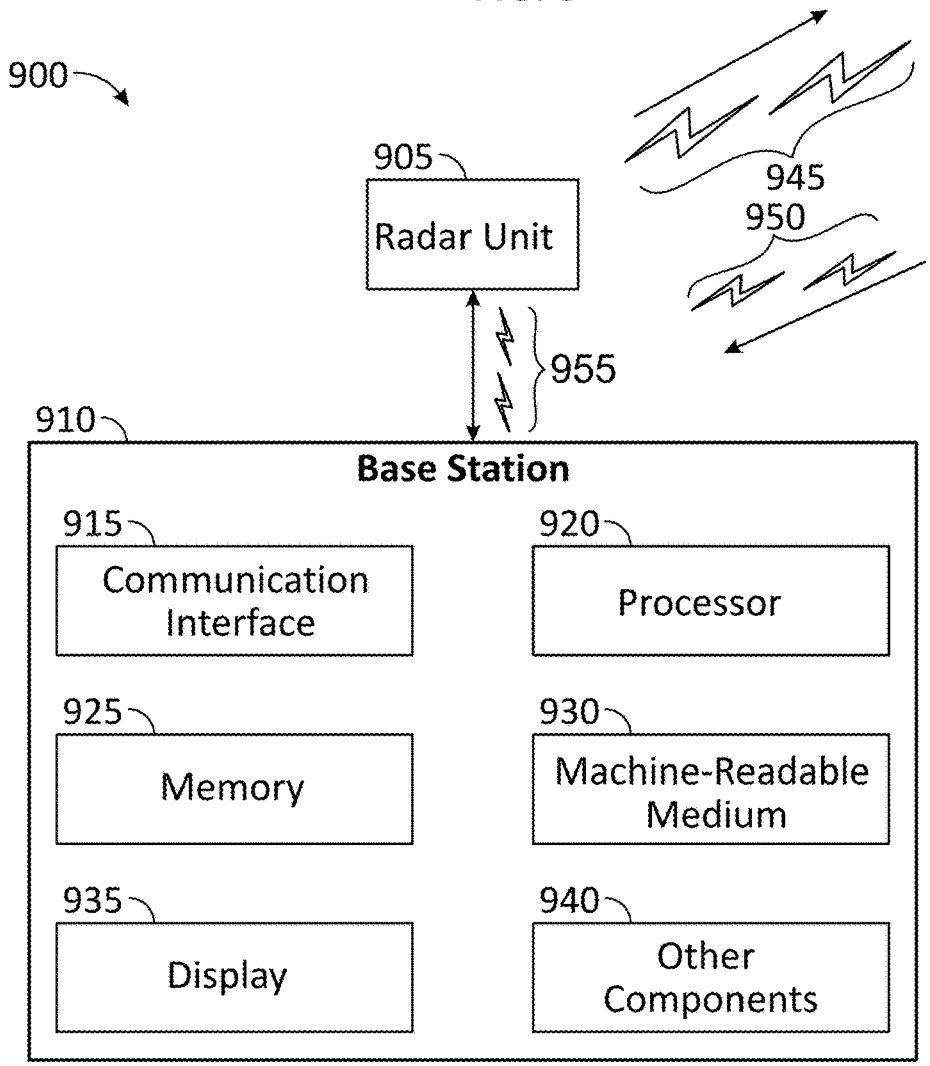
FIG. 9 illustrates a block diagram of an example radar system in accordance with one or more embodiments of the present disclosure.

FIG. 9 illustrates a block diagram of a radar system 900 including a radar unit 905 and a base station 910 in accordance with one or more embodiments of the present disclosure. In various embodiments, the radar system 900 may be configured for use on watercraft, aircraft, vehicles, fixed locations, or other environments, and may be used for various applications such as, for example, leisure navigation, commercial navigation, military navigation, other types of navigation, or other applications. In one aspect, the radar unit 905 may be implemented as a relatively compact portable unit that may be conveniently installed by a user. In some embodiments, the radar system 900 may be, may include, or may be a part of any one of the radar systems 100, 200, 600, and 700 of FIGS. 1, 2, 6, and 7, respectively.

As further described below, the radar system 900 may be implemented as one or more electrically and/or mechanically coupled controllers, transmitters, receivers, transceivers, signal processing logic devices, various electrical components, antenna elements of various shapes and sizes, multichannel antennas/antenna modules, radar assemblies, assembly brackets, mast brackets, and/or various actuators adapted to adjust orientations of any of the components of the radar system 900. For example, in various embodiments, the radar system 900 may be implemented according to various radar system arrangements (e.g., remote sensing system arrangements) that can be used to detect features of and objects on or above a terrestrial surface or a surface of a body of water.

In some cases, the radar system 900 may be configured to emit one, multiple, or a series of radar beams (e.g., remote sensor beams), receive corresponding radar returns (e.g., remote sensor returns), and convert the radar returns into radar data and/or imagery (e.g., remote sensor image data), such as one or more intensity plots and/or aggregation of intensity plots indicating a relative position, orientation, and/or other characteristics of structures, weather phenomena, waves, other mobile structures, surface boundaries, and/or other objects reflecting the radar beams back at the radar system 900. Moreover, such data may be used to generate one or more charts corresponding to automatic identification system (AIS) data, automatic radar plotting aid (ARPA) data, mini-ARPA (MARPA) data, and or one or more other target tracking and/or identification protocols.

The radar unit 905 may be implemented to broadcast radar signals 945 and receive reflected return signals 950 (e.g., reflections from one or more targets/objects) in response thereto. The radar signals 945 and the return signals 950 may be pulsed signals, FMCW signals, and/or other types of signals appropriate for radar applications. In some aspects, the radar unit 905 may include the RF board 105 of FIG. 1, the RF circuit 205 and the ADC circuit 210 of FIG. 2, the RF board 605 of FIG. 6, the RF board 705 of FIG. 7, and/or portions and/or variants thereof.

The radar unit 905 may be in communication with the base station 910 through wired and/or wireless signals (e.g., collectively denoted by 955) to provide, for example, radar data to the base station 910 corresponding to the return signals 950. For example, wired signals may be passed by Ethernet and/or other wired communication techniques. Wireless signals may be implemented in accordance with various wireless technology including, for example, Wi-Fi™, Bluetooth™, or other standardized or proprietary wireless communication techniques.

The base station 910 may be used to receive, process, and display radar data received from radar unit 905. In one embodiment, the base station 910 may be installed at a fixed location. In another embodiment, the base station 910 may be a portable device, such as a personal electronic device (e.g., a cell phone, personal digital assistant, laptop computer, camera, or other device). In one embodiment, the base station 910 may operate as a control unit to provide control signals to the radar unit 905 through the wired signals and/or wireless signals 955 to control the operation of the radar unit 905. In an embodiment, the base station 910 may generate CIF frames based on the radar data (e.g., corresponding to the return signals 950) received by the base station 910 from the radar unit 905.

The base station 910 includes a communication interface 915, a processor 920, a memory 925, a machine-readable medium 930, a display 935, and other components 940. The communication interface 915 may communicate with the radar unit 905 through one or more wired interfaces and/or one or more wireless interfaces. In some cases, the communication interface 915 may facilitate communication with the radar unit 905 via inter-chip and/or intra-chip signals. The processor 920 may be implemented as any appropriate processing device (e.g., microcontroller, processor, application specific integrated circuit (ASIC), logic device, FPGA, circuit, or other device) that may be used by base station 910 to execute appropriate instructions, such as non-transitory machine readable instructions (e.g., software) stored on the machine-readable medium 930 and loaded into the memory 925. For example, the processor 920 may be configured to receive and process radar data received by the communication interface 915, store the radar data, processed radar data, and/or other data associated with the radar data in the memory 925, and provide the radar data, processed radar data, and/or other data associated with the radar data for processing, storage, and/or display. For example, outputs of the processor 920 may be, or may be derived into, representations of processed radar data that can be displayed by the display 935 for presentation to one or more users. In an embodiment, the processor 920 may convert radar data received from the radar unit 905 to CIF frames. The processor 920 may include a VPU. In some embodiments, the processor 920 may be, may include, or may be a part of the processing board 110 of FIG. 1, the FPGA 215 and/or the VPU 220 of FIG. 2, the processing board 610 of FIG. 6, the processing board 710 of FIG. 7, and/or portions and/or variants thereof.

The memory 925 includes, in one embodiment, one or more memory devices configured to store data and information, including radar data. The memory 925 may include one or more various types of memory devices including volatile and non-volatile memory devices, such as random access memory (RAM), DRAM, static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processor 920 may be configured to execute software instructions stored in the memory 925 so as to perform method and process steps and/or operations. The processor 920 may be configured to store in the memory 925 (e.g., CIF frames, FFT results, object/target detection data).

The display 935 may be used to present radar data, images, or information received or processed by the base station 910. For example, in one embodiment, the display 935 may be viewable by one or more users of the radar system 900. In one embodiment, the display 935 may be a multifunction display with a touchscreen configured to receive user inputs to control the base station 910.

The base station 910 may include various other components 940 that may be used to implement other features such as, for example, sensors, actuators, communications modules/nodes, other user controls, communication with other devices, additional and/or other user interface devices, and/ or other components. In some embodiments, other components 940 may include a humidity sensor, a wind and/or water temperature sensor, a barometer, a visible spectrum camera, an infrared camera, and/or other sensors providing measurements and/or other sensor signals that can be displayed to a user and/or used by other devices of radar system 900 to provide operational control of the radar unit 905 and/or the base station 910. Such operational control may include control of radar operations. For example, such sensor signals may be utilized to compensate for environmental conditions, such as wind speed and/or direction; swell speed, amplitude, and/or direction; and/or an object in a path (e.g., line of sight) of the radar unit 905 and/or the base station 910. Imagers (e.g., visible spectrum camera, infrared camera) may be utilized to provide situational awareness of a scene, such as by providing image data associated with captured radar data. In some cases, sensor information can be used to correct for movement (e.g., changes in position and/or speed) associated with the radar unit 905 and/or the base station 910 between beam emissions to provide improved alignment of corresponding radar returns/samples, for example, and/or to generate imagery based on the measured orientations and/or positions of the radar assembly/antenna. In some cases, an external orientation and/or position sensor can be used alone or in combination with an integrated sensor or sensors. In some aspects, various of the other components 940 described above may be included in the radar unit 905 alternative to or in addition to being included in the base station 910. In some cases, alternatively or in addition to having sensors and/or other devices as part of the radar unit 905 and/or the base station 910, the sensors and/or other devices may be collocated with the radar unit 905 and/or the base station 910. Such sensors and/or other devices may provide data to the radar unit 905 and/or the base station 910 (e.g., via wired and/or wireless communication).

In various embodiments, one or more components shown as being provided as part of the base station 910 may be implemented, alternatively or in addition, in the radar unit 905. In some cases, the radar unit 905 may include one or more visible spectrum cameras and/or one or more infrared cameras, such as to capture image data of a scene scanned by the radar unit 905. In one embodiment, operations described herein as being performed by the processor 920 may be performed by an appropriate processor and related components of the radar unit 905, and vice versa. In some aspects, the radar unit 905 and the base station 910 may be collocated. For example, in some cases, communication between the radar unit 905 and the base station 910 may be through inter-chip and/or intra-chip communication. In one case, the radar unit 905 and the base station 910 may be within a common housing. In one embodiment, the communication interface 915 may communicate with another device which may be implemented with some or all of the features of the base station 910. Such communication may be performed through appropriate wired or wireless signals (e.g., Wi-Fi™, Bluetooth™, or other standardized or proprietary wireless communication techniques). In one example, the base station 910 may be located at a first position (e.g., on a bridge of a watercraft in one embodiment) and may communicate with a personal electronic device (e.g., a cell phone in one embodiment) located at a second position (e.g., co-located with a user on another location on the watercraft). In this regard, the user's personal electronic device may receive radar data and/or other information from the base station 910 and/or the radar unit 905. As a result, a user may conveniently receive relevant information (e.g., radar images, alerts, or other information) even while not in proximity to the base station 910.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A radar system, comprising:
a frame generation circuit configured to:
receive radar signals; and
convert the radar signals to at least one frame having a camera interface format, wherein the at least one frame comprises a plurality of lines, and wherein each line comprises a plurality of pixels;
a frame processing circuit configured to:
receive the at least one frame via a camera interface; and
process the at least one frame by performing at least one of applying a window function, performing a Fourier Transform, or performing beamforming,
wherein the frame processing circuit comprises a first processing portion configured to apply the window function to a first group of adjacent lines of the plurality of lines to obtain a processed first group of adjacent lines.

2. The radar system of claim 1, wherein the frame processing circuit comprises a multi-vector processor configured to perform multi-vector parallel processing to process the at least one frame.

3. The radar system of claim 1, wherein the frame processing circuit is further configured to receive, via the camera interface, a vertical synchronization (VSYNC) signal associated with the at least one frame and a plurality of horizontal synchronization (HSYNC) signals associated with the at least one frame.

4. The radar system of claim 1, wherein the frame processing circuit is implemented using a vision processor unit.

5. The radar system of claim 1, wherein the frame generation circuit is implemented using a field-programmable gate array.

6. The radar system of claim 1, wherein:
the frame processing circuit further comprises a second processing portion configured to perform the Fourier Transform on the processed first group of adjacent lines to obtain a further processed first group of adjacent lines; and
the first processing portion is configured to apply the window function to a second group of adjacent lines of the plurality of lines to obtain a processed second group of adjacent lines while the second processing portion is performing the Fourier Transform on the processed first group of adjacent lines, wherein the first group of adjacent lines and the second group of adjacent lines are adjacent groups of lines in the at least one frame.

7. The radar system of claim 6, wherein the Fourier Transform comprises a range Fast Fourier Transform.

8. The radar system of claim 6, wherein:
the frame processing circuit further comprises a third processing portion configured to perform beamforming on the further processed first group of adjacent lines;
the second processing portion is configured to perform the Fourier Transform on the processed second group of adjacent lines to obtain a further processed second group of adjacent lines;
the first processing portion is configured to apply the window function to a third group of adjacent lines of the plurality of lines to obtain a processed third group of adjacent lines while the second processing portion is performing the Fourier Transform on the processed second group of adjacent lines, wherein the second group of adjacent lines and the third group of adjacent lines are adjacent groups of lines in the at least one frame; and
the second processing portion is configured to perform the Fourier Transform to the processed second group of adjacent lines while the third processing portion is performing beamforming on the further processed first group of adjacent lines.

9. The radar system of claim 1, further comprising:
a set of transmit antenna elements configured to transmit first radar waveforms;
a set of receive antenna elements configured to receive second radar waveforms, wherein the second radar waveforms are return signals associated with the first radar waveforms; and
an analog-to-digital converter configured to generate the radar signals based on the second radar waveforms.

10. The radar system of claim 9, wherein each of the plurality of lines comprises radar data from each of the set of receive antenna elements.

11. The radar system of claim 10, wherein the second radar waveforms are frequency-modulated continuous wave (FMCW) waveforms.

12. A method for facilitating radar data processing, the method comprising:
receiving radar signals;
converting the radar signals to at least one frame having a camera interface format, wherein the at least one frame comprises a plurality of lines, and wherein each line comprises a plurality of pixels;
transmitting the at least one frame on a camera interface; and
processing the at least one frame received via the camera interface, wherein the processing comprises:
applying a window function to a first group of adjacent lines of the plurality of lines to obtain a processed first group of adjacent lines;
performing a Fourier Transform on the processed first group of adjacent lines to obtain a further processed first group of adjacent lines; and applying the window function to a second group of adjacent lines of the plurality of lines to obtain a processed second group of adjacent lines while the performing the Fourier Transform is performed on the processed first group of adjacent lines, wherein the first group of adjacent lines and the second group of adjacent lines are adjacent groups of lines.

13. The method of claim 12, wherein the processing is based on multi-vector parallel processing.

14. The method of claim 12, wherein the transmitting comprises transmitting, on the camera interface, the at least one frame, a vertical synchronization (VSYNC) signal associated with the at least one frame, and a plurality of horizontal synchronization (HSYNC) signals associated with the at least one frame.

15. The method of claim 12, wherein the converting is performed by a field-programmable gate array, and/or wherein the processing is performed by a vision processor unit.

16. The method of claim 12, wherein the processing further comprises:
performing beamforming on the further processed first group of adjacent lines;
performing the Fourier Transform on the processed second group of adjacent lines while the performing the beamforming is performed on the further processed first group of adjacent lines; and
applying the window function to a third group of adjacent lines of the plurality of lines while the performing the Fourier Transform is performed on the processed second group of adjacent lines, wherein the second group of adjacent lines and the third group of adjacent lines are adjacent groups of lines in the at least one frame.

17. The method of claim 12, further comprising:
transmitting first radar waveforms;
receiving second radar waveforms, wherein the second radar waveforms are return signals associated with the first radar waveforms; and
generating the radar signals based on the second radar waveforms, wherein the second radar waveforms are frequency-modulated continuous wave (FMCW) waveforms, and wherein each of the plurality of lines comprises radar data associated with at least one antenna element.

18. The method of claim 17, wherein the radar signals comprise a plurality of in-phase signals and a plurality of quadrature signals.

19. The method of claim 12, wherein the window function comprises a first window function, wherein the Fourier Transform comprises a first Fourier Transform, the method further comprising:
performing beamforming on the further processed first group of adjacent lines;
performing data re-organization based on the further processed first group of adjacent lines to obtain a plurality of vectors;
applying a second window function to the plurality of vectors to obtain a plurality of processed vectors; and
performing a second Fourier Transform on the plurality of processed vectors.

20. The method of claim 19, wherein the first Fourier Transform comprises a range Fast Fourier Transform, and wherein the second Fourier Transform comprises a Doppler Fast Fourier Transform.

* * * * *